(12) United States Patent
Sakane et al.

(10) Patent No.: US 10,946,720 B2
(45) Date of Patent: Mar. 16, 2021

(54) AIRFLOW CONTROL SYSTEM

(71) Applicant: DENSO CORPORATION, Kariya (JP)

(72) Inventors: Hiroyuki Sakane, Kariya (JP); Nobukazu Kuribayashi, Kariya (JP); Shirou Bandou, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 214 days.

(21) Appl. No.: 15/772,131

(22) PCT Filed: Oct. 6, 2016

(86) PCT No.: PCT/JP2016/079788
§ 371 (c)(1),
(2) Date: Apr. 30, 2018

(87) PCT Pub. No.: WO2017/077811
PCT Pub. Date: May 11, 2017

(65) Prior Publication Data
US 2018/0312039 A1    Nov. 1, 2018

(30) Foreign Application Priority Data
Nov. 3, 2015    (JP) .............................. JP2015-216229

(51) Int. Cl.
*B60H 1/00* (2006.01)
*B60H 1/04* (2006.01)
(Continued)

(52) U.S. Cl.
CPC ......... *B60H 1/025* (2013.01); *B60H 1/00735* (2013.01); *B60H 1/00864* (2013.01); *B60H 1/16* (2013.01); *B60K 11/04* (2013.01); *B60K 11/085* (2013.01); *F01P 7/10* (2013.01); *F01P 11/10* (2013.01); *B60H 1/02* (2013.01); *B60H 1/04* (2013.01); *F01P 7/02* (2013.01)

(58) Field of Classification Search
CPC .... B60H 1/16; B60H 1/02; B60H 1/04; F01P 11/10; F01P 7/02
See application file for complete search history.

(56) References Cited

U.S. PATENT DOCUMENTS

2011/0061405 A1    3/2011   Watanabe et al.
2013/0020046 A1    1/2013   Momose et al.

FOREIGN PATENT DOCUMENTS

JP    S47034996 Y1    10/1972
JP    S50000643 U     1/1975
(Continued)

*Primary Examiner* — Leonard R Leo
(74) *Attorney, Agent, or Firm* — Harness, Dickey & Pierce, P.L.C.

(57) ABSTRACT

An airflow control system includes an air blower and an outlet door. The air blower is disposed on a front side in a vehicle traveling direction with respect to an inside of a cabin and disposed inside an engine compartment that houses a propulsion engine. The outlet door opens and closes an air outlet through which an air flow from an inside of the engine compartment is blown to another area on a rear side in the vehicle traveling direction with respect to the engine compartment. The air blower blows an air flow containing exhaust heat of the propulsion engine to the other area through the air outlet while the air outlet is opened by the outlet door.

16 Claims, 18 Drawing Sheets

(51) Int. Cl.
*B60K 11/04* (2006.01)
*F01P 7/02* (2006.01)
*B60H 1/02* (2006.01)
*B60H 1/16* (2006.01)
*F01P 11/10* (2006.01)
*B60K 11/08* (2006.01)
*F01P 7/10* (2006.01)

(56) References Cited

FOREIGN PATENT DOCUMENTS

| JP | S50012842 Y1 | | 4/1975 |
|----|---|---|---|
| JP | H10024867 A | | 1/1998 |
| JP | 2006244928 A | | 9/2006 |
| JP | 2008106727 A | * | 5/2008 |
| JP | 2008290523 A | | 12/2008 |
| JP | 2011084080 A | | 4/2011 |
| JP | 2012246790 A | | 12/2012 |
| JP | 2013023048 A | | 2/2013 |
| WO | WO-2016042709 A1 | | 3/2016 |

* cited by examiner

FRONT ← → REAR
VEHICLE TRAVELING DIRECTION

AIRFLOW CONTROL SYSTEM

CROSS REFERENCE TO RELATED APPLICATIONS

This application is a U.S. National Phase Application under 35 U.S.C. 371 of International Application No. PCT/JP2016/079788 filed on Oct. 6, 2016 and published in Japanese as WO 2017/077811 A1 on May 11, 2017. This application is based on and claims the benefit of priority from Japanese Patent Application No. 2015-216229 filed on Nov. 3, 2015. The entire disclosures of all of the above applications are incorporated herein by reference.

TECHNICAL FIELD

The present invention relates to an airflow control system.

BACKGROUND ART

As a conventional technique, for example, Patent Literature 1 describes an exhaust heat recovery apparatus for vehicle including a radiator which is disposed between a front opening and a propulsion engine in an engine compartment, and a fan which is disposed between the propulsion engine and the radiator.

In the exhaust heat recovery apparatus, the fan sucks an air flow heated by exhaust heat of the propulsion engine from the lower side of the propulsion engine and blows out the sucked air flow toward the radiator so that the air flow passes through the radiator. Thus, in the radiator, the exhaust heat contained in the air flow can be transmitted to the propulsion engine through a heating medium (e.g., an engine cooling water). Accordingly, it is possible to recover the exhaust heat of the propulsion engine by the radiator to accelerate warming-up of the propulsion engine.

PRIOR ART LITERATURES

Patent Literature

Patent Literature 1: JP 2012-246790 A

SUMMARY OF INVENTION

As described above, in the exhaust heat recovery apparatus of Patent Literature 1, exhaust heat of the propulsion engine is recovered by the radiator, and the recovered exhaust heat is used in the warming-up of the propulsion engine. Thus, as the warming-up of the propulsion engine progresses, the temperature of the heating medium converges to a predetermined temperature in the end, and an exhaust heat recovery capacity by the radiator is reduced. Thus, when the warming-up of the propulsion engine ends, the exhaust heat of the propulsion engine contained in the air flow is not used in warming-up of the propulsion engine, but discharged to the outside of the vehicle.

On the other hand, with improvements in engine efficiency in recent years, exhaust heat from propulsion engines is decreasing. Thus, for example, it is becoming more difficult for a system which provides comfort by heating or visibility support by defogging of the front windshield to secure exhaust heat of the propulsion engine as a heat source.

In view of the above points, it is an object of the present invention to provide an airflow control system capable of using exhaust heat of a propulsion engine in another area outside an engine compartment.

For achieving the above object or objects, according to an invention described in claim 1, there is provided an air blower disposed on a front side in a vehicle traveling direction with respect to an inside of a cabin and disposed inside an engine compartment that houses a propulsion engine, and an outlet door that opens and closes an air outlet through which an air flow from an inside of the engine compartment is blown to another area on a rear side in the vehicle traveling direction with respect to the engine compartment, where the air blower blows an air flow containing exhaust heat of the propulsion engine to the other area through the air outlet while the air outlet is opened by the outlet door.

According to the invention described in claim 1, it is possible to use the exhaust heat of the propulsion engine in another area by blowing out an air flow blown from the air blower to the other area through the air outlet.

A reference sign inside the parentheses of each means described in the above column and claims represents the correspondence with specific means described in the embodiments described below.

EMBODIMENTS FOR CARRYING OUT INVENTION

Hereinbelow, embodiments of the present invention will be described with reference to the drawings. Identical or equivalent elements between embodiments will be designated by the same reference sign throughout the drawings to simplify description.

First Embodiment

Figure 1:
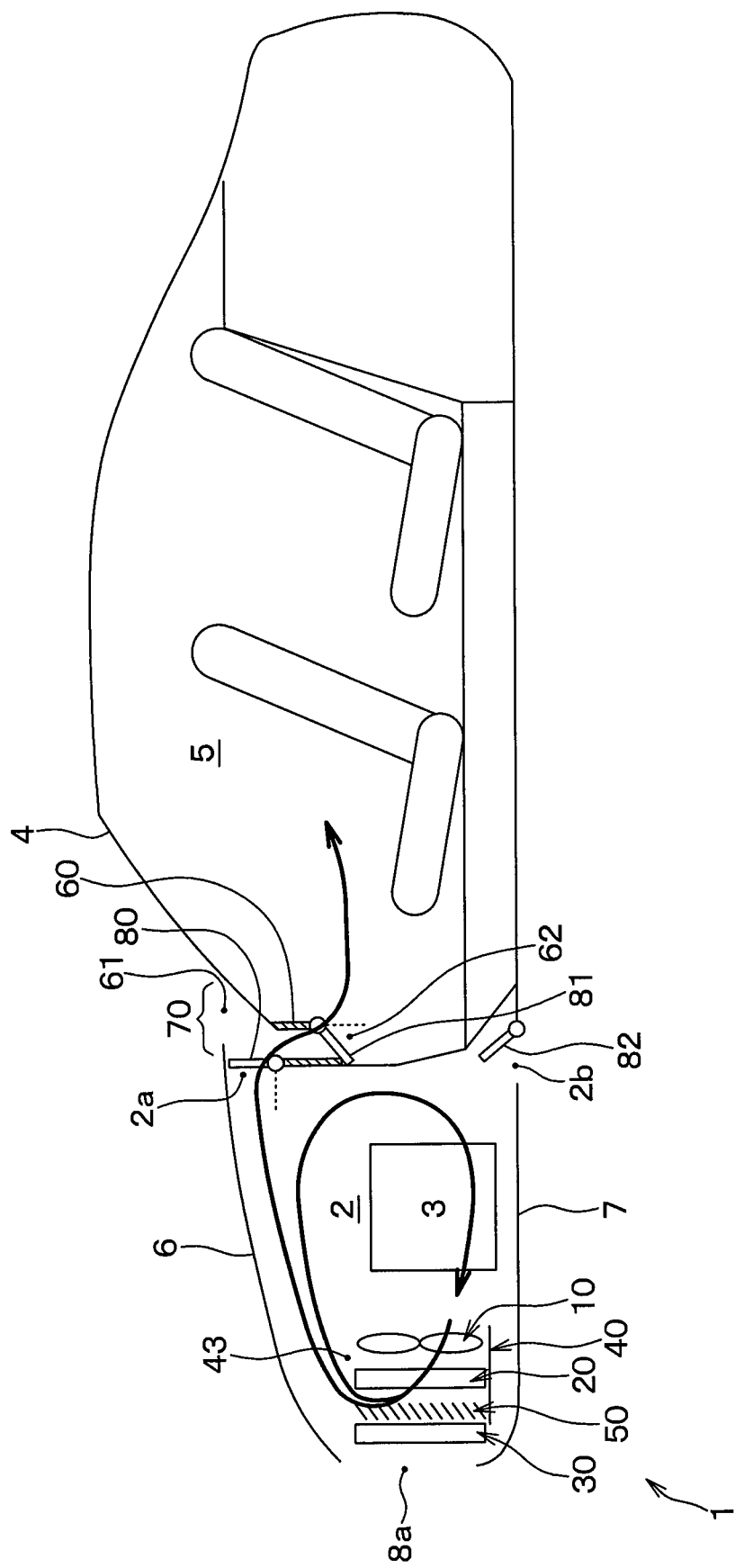
FIG. 1 is a diagram illustrating an entire configuration of an airflow control system in a first embodiment.

FIG. 1 is a diagram illustrating an entire configuration of an airflow control system 1 in a first embodiment.

The airflow control system 1 controls an air flow inside an engine compartment 2 of a vehicle to perform cooling and warming-up of a propulsion engine 3, defogging of a front windshield 4, and heating inside a cabin 5.

The engine compartment 2 of the present embodiment is a space that houses the propulsion engine 3 and located on the front side in a vehicle traveling direction with respect to the cabin 5 in the vehicle 1. The propulsion engine 3 is an internal combustion engine that applies torque to driving wheels of the vehicle.

An engine hood 6 is disposed on the upper side in a top-bottom direction of the engine compartment 2 of the vehicle. The engine hood 6 covers the upper side in the top-bottom direction of the engine compartment 2. An undercover 7 is disposed on the lower side in the top-bottom direction of the engine compartment 2. The undercover 7 covers the lower side in the top-bottom direction of the engine compartment 2.

As illustrated in FIG. 1, the airflow control system 1 includes an electric fan 10, a radiator 20, a condenser 30, a shroud 40, and a shutter 50.

The electric fan 10, the radiator 20, the condenser 30, the shroud 40, and the shutter 50 constitute an air blower disposed inside the engine compartment 2.

The electric fan 10 is disposed between a front opening 8a and the propulsion engine 3 in the engine compartment 2. The electric fan 10 rotates a fan in a normal direction to blow out an air flow sucked from the front side in the vehicle traveling direction through the front opening 8a, the condenser 30, the shutter 50, and the radiator 20 toward the propulsion engine 3. On the other hand, the electric fan 10 rotates the fan in a reverse direction to blow out an air flow sucked from the propulsion engine 3 toward the radiator 20.

The electric fan 10 of the present embodiment includes the fan, which is an axial-flow fan, and an electric motor which rotates the fan. The front opening 8a is formed on, for example, a front damper and opens the engine compartment 2 on the front side in the vehicle traveling direction.

The radiator 20 is a heat exchanger disposed between the electric fan 10 and the front opening 8a. The radiator 20 transfers heat between the propulsion engine 3 and an air flow through a heating medium. For example, a liquid obtained by mixing an antifreeze with water, that is, an engine cooling water is used as the heating medium.

The condenser 30 is disposed between the radiator 20 and the front opening 8a. The condenser 30 constitutes an air conditioner refrigeration cycle which circulates a refrigerant together with a compressor, a pressure reducing valve, and an evaporator. The condenser 30 is a heat exchanger that radiates heat from the refrigerant to an air flow.

Figure 2:
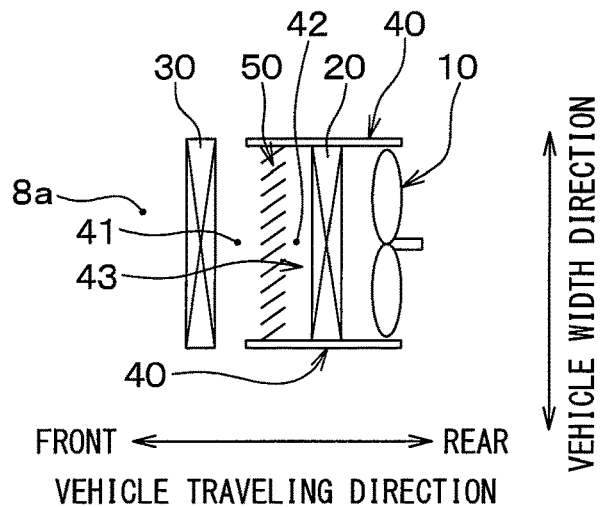
FIG. 2 is an arrangement diagram of an electric fan, a radiator, a condenser, a shroud, and a shutter of FIG. 1 viewed from the upper side in a top-bottom direction.

The shutter 50 is disposed between the condenser 30 and the radiator 20. As illustrated in FIG. 2, the shutter 50 opens and closes an air passage 41 between the radiator 20 and the front opening 8a. The air passage 41 corresponds to a first air passage.

The shutter 50 of the present embodiment includes a plurality of doors which are arranged in the top-bottom direction or the vehicle width direction. The shutter 50 opens and closes the air passage 41 by opening and closing the doors by an electric actuator.

The shroud 40 supports the electric fan 10 and forms an air passage 42 from the electric fan 10 to the shutter 50 through the radiator 20. The air passage 42 corresponds to a second air passage. As illustrated in FIGS. 1 and 2, the shroud 40 is configured to cover the air passage 42 from the lower side in the top-bottom direction, the right side in the vehicle width direction, and the left side in the vehicle width direction.

The shroud 40 of the present embodiment forms an air outlet 43 through which an air flow blown from the electric fan 10 is blown out. The air outlet 43 is formed between the electric fan 10 and the shutter 50 and open on the upper side in the top-bottom direction. That is, the air outlet 43 is open on the upper side in the top-bottom direction which intersects a direction connecting the shutter 50 and the electric fan 10 (that is, the vehicle traveling direction).

An air distribution destination duct 60 is a duct for guiding an air flow blown out through an air outlet 2a of the engine compartment 2 to a shield blowout port 61 and an in-cabin introduction port 62. The air distribution destination duct 60 of the present embodiment is disposed in a cowl area 70.

The cowl area 70 is formed between the front windshield 4, the cabin 5, and the engine compartment 2 and communicates with the outside of the vehicle on the upper side in the top-bottom direction.

The air outlet 2a is formed between the engine compartment 2 and the cowl area 70.

The shield blowout port 61 is an opening through which the air flow blown out through the air outlet 2a of the engine compartment 2 is blown to the outer surface of the front windshield 4. The outer surface of the front windshield 4 is located on the front side in the vehicle traveling direction of the front windshield 4. The in-cabin introduction port 62 is an opening through which the air flow blown out through the air outlet 2a of the engine compartment 2 is blown into the cabin 5.

The outer surface of the front windshield 4 and the inside of the cabin 5 are located on the rear side in the vehicle traveling direction with respect to the engine compartment 2. Thus, the outer surface of the front windshield 4 and the inside of the cabin 5 correspond to another area located on the rear side in the vehicle traveling direction with respect to the engine compartment 2.

A return flow switching door 80 opens and closes the air outlet 2a. An air distribution destination switching door 81 is an outlet door that opens and closes the in-cabin introduction port 62. The air distribution destination switching door 81 corresponds to an introduction port door. An exhaust heat door 82 opens and closes an exhaust port 2b of the engine compartment 2. The exhaust port 2b is a hole that is formed on the rear side in the vehicle traveling direction of the undercover 7 and allows the inside of the engine compartment 2 and the outside of the vehicle on the lower side in the top-bottom direction of the vehicle to communicate with each other.

Next, an electric configuration of the airflow control system 1 of the present embodiment will be described.

Figure 3:
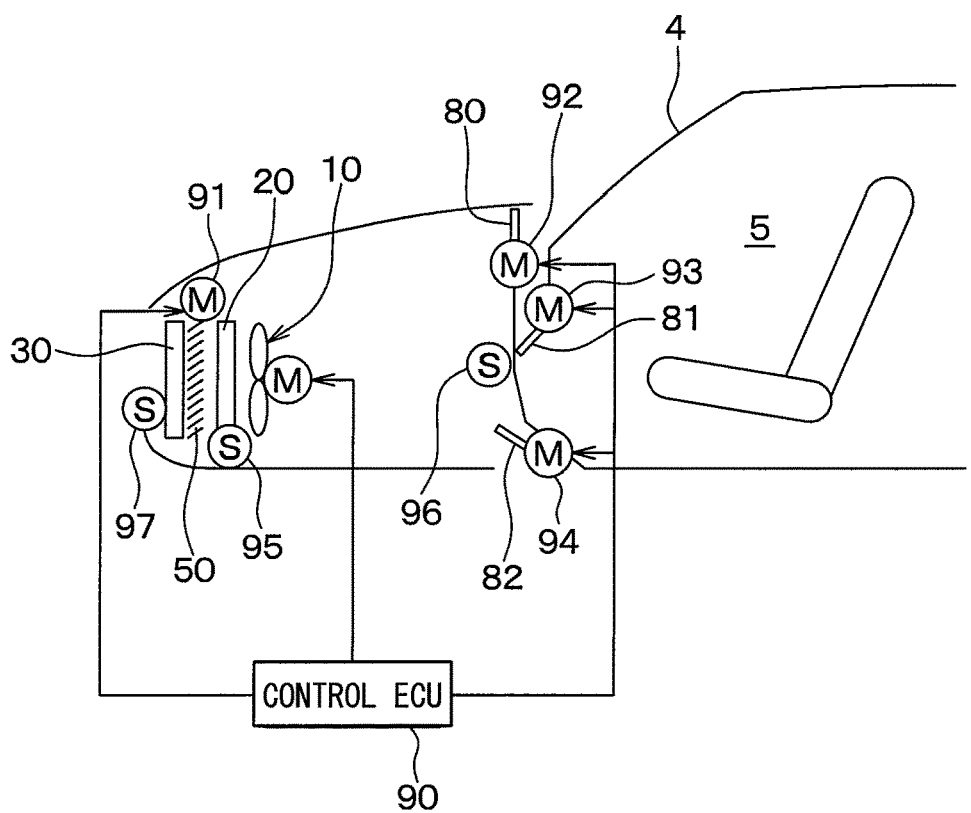
FIG. 3 is a schematic diagram illustrating an electric configuration of the airflow control system in the first embodiment.

As illustrated in FIG. 3, the airflow control system 1 of the present embodiment includes a control ECU 90, electric actuators 91, 92, 93, 94, and sensors 95, 96, 97.

The control ECU 90 includes a microcomputer and a memory and executes an airflow control process in accordance with a computer program. The memory is a nontransitive and substantive storage medium.

The control ECU 90 controls the shutter 50, the return flow switching door 80, the air distribution destination switching door 81, and the exhaust heat door 82 through the electric actuators 91 to 94 in accordance with output signals of the sensors 95 to 97 or communication with another ECU such as an air conditioning ECU with the execution of the airflow control process.

The electric actuator 91 is an electric motor that opens and closes the shutter 50. The electric actuator 92 is an electric motor that opens and closes the return flow switching door 80. The electric actuator 93 is an electric motor that opens and closes the air distribution destination switching door 81. The electric actuator 94 is an electric motor that opens and closes the exhaust heat door 82.

The sensor 95 is a temperature sensor that detects the temperature of the heating medium circulated between the radiator 20 and the propulsion engine 3 (hereinbelow, the temperature is referred to as a heating medium temperature Tw). The sensor 96 is a temperature sensor that detects an air temperature Tair inside the engine compartment 2. The sensor 97 is a temperature sensor that detects an air temperature Tamb which is an ambient temperature outside the vehicle.

Next, the operation of the airflow control system 1 of the present embodiment will be described.

The control ECU 90 executes the airflow control process in accordance with flowcharts of FIGS. 4A, 4B, 4C, 4D, and 4E.

Figure 4A:
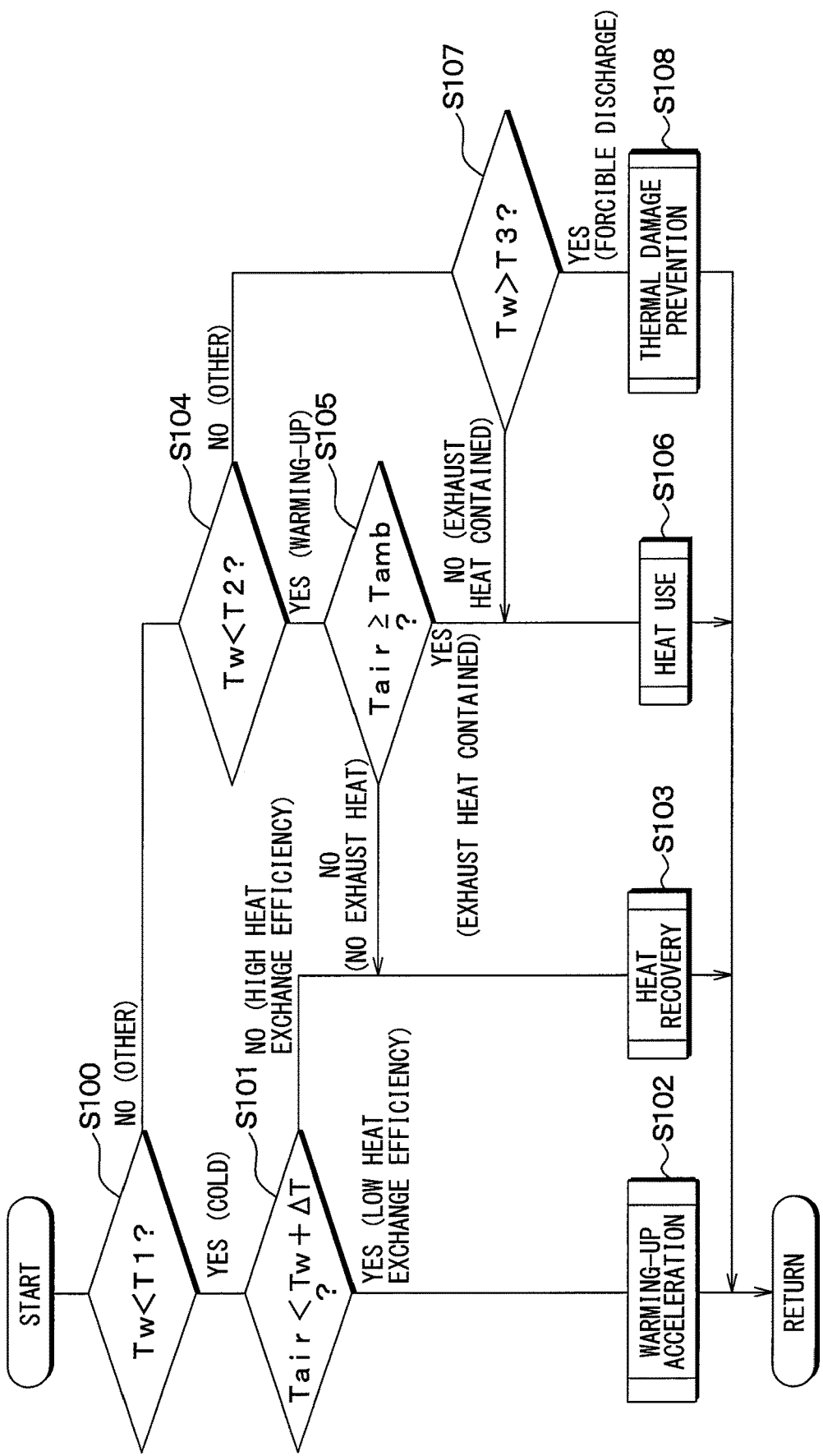
FIG. 4A is a flowchart illustrating a control process of a control ECU of FIG. 3.
Figure 4B:
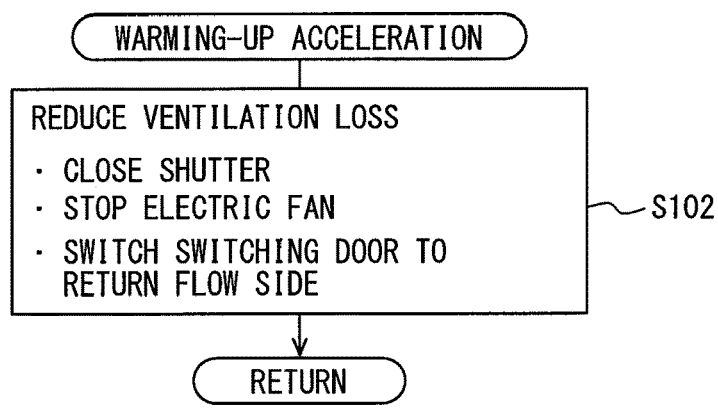
FIG. 4B is a flowchart illustrating a warming-up acceleration process in FIG. 4A.
Figure 4C:
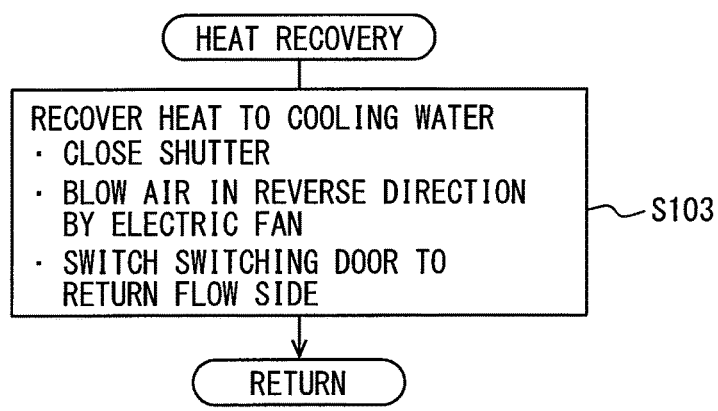
FIG. 4C is a flowchart illustrating a heat recovery process in FIG. 4A.
Figure 4D:
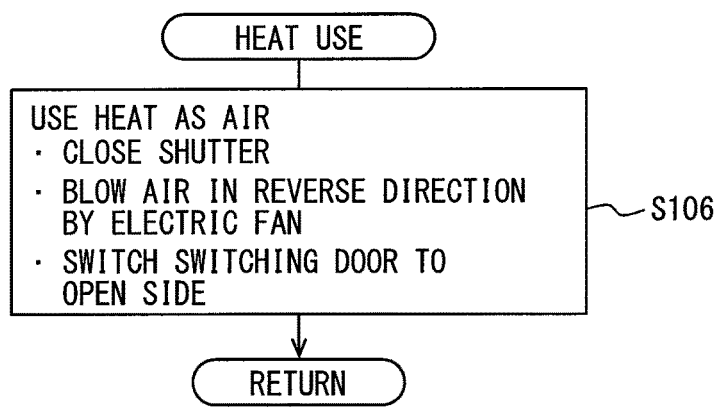
FIG. 4D is a flowchart illustrating a heat use process in FIG. 4A.
Figure 4E:
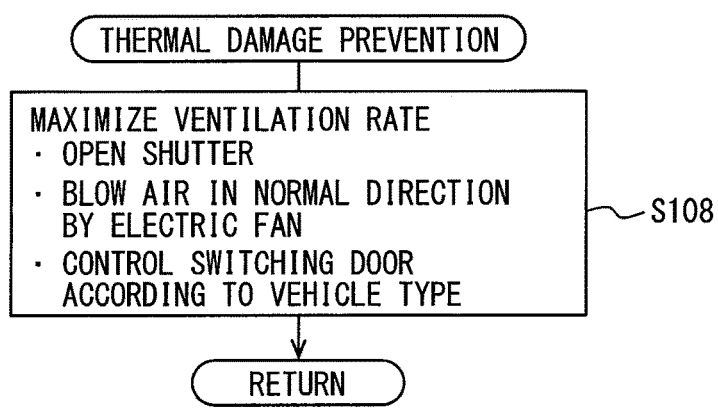
FIG. 4E is a flowchart illustrating a thermal damage prevention process in FIG. 4A.

First, in step S100 of FIG. 4A, the control ECU 90 determines whether the heating medium temperature Tw is lower than a threshold T1 on the basis of a detection value of the sensor 95. At this time, when the heating medium temperature Tw is lower than the threshold T1, the control ECU 90 determines YES in step S100.

Then, in step S101, it is determined whether the air temperature Tair<(the heating medium temperature Tw+$\Delta$T) is satisfied on the basis of the detection value of the sensor 95 and a detection value of the sensor 96 to determine whether a heat exchange efficiency is low. In the determination, hysteresis may be set as described below.

The heat exchange efficiency is the efficiency of heat exchange that is performed between an air flow passing through the radiator 20 and the heating medium for transferring heat from the air flow to the heating medium.

When a difference value ST obtained by subtracting the heating medium temperature Tw from the air temperature Tair (=the air temperature Tair−the heating medium temperature Tw) is lower than the predetermined value $\Delta$T, the control ECU 90 determines that the air temperature Tair<(the heating medium temperature Tw+$\Delta$T) is satisfied. In this case, the control ECU 90 determines that the heat exchange efficiency is low, that is, YES in step S101.

In this case, in step S102, the control ECU 90 executes a warming-up acceleration process for accelerating the warming-up of the propulsion engine 3.

Specifically, the air passage 41 between the radiator 20 and the front opening 8a is closed by controlling the shutter 50 by the electric actuator 91. The electric fan 10 is stopped. The air outlet 2a of the engine compartment 2 is closed by controlling the return flow switching door 80 by the electric actuator 92. At this time, when there is the exhaust heat door 82, the exhaust heat door 82 is closed.

Figure 5A:
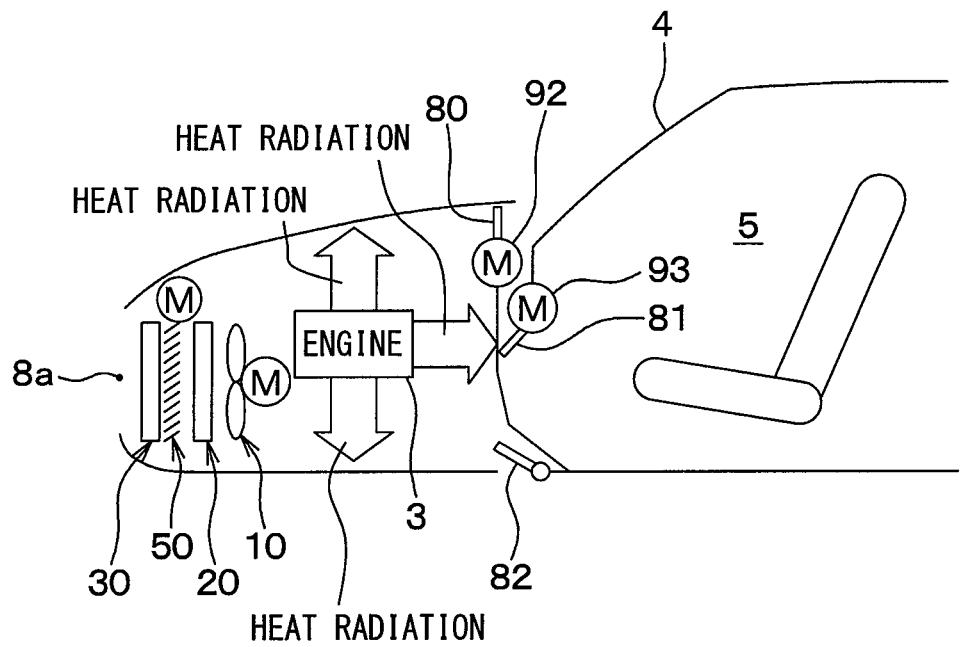
FIG. 5A is a schematic diagram for describing an operation during the execution of the warming-up acceleration process.

Accordingly, the shutter 50 closes the air passage 41, and the return flow switching door 80 closes the air outlet 2a. Thus, the discharge of exhaust heat of the propulsion engine 3 to the outside of the engine compartment 2 is reduced. Thus, as illustrated in FIG. 5A, the warming-up is accelerated in the propulsion engine 3 by the exhaust heat contained in an air flow inside the engine compartment 2. Then, the control ECU 90 returns to step S100.

In step S101 described above, when the difference value ST (=the air temperature Tair−the heating medium temperature Tw) is higher than the predetermined value $\Delta$T, the control ECU 90 determines that the heat exchange efficiency is high, that is, NO.

In this case, in step S103, the control ECU 90 executes a heat recovery process for recovering exhaust heat of the propulsion engine 3 and transmitting the recovered heat to the propulsion engine 3.

Specifically, the control ECU 90 closes the air passage 41 between the radiator 20 and the front opening 8a by controlling the shutter 50 by the electric actuator 91. The electric fan 10 is rotated in the reverse direction. The air outlet 2a of the engine compartment 2 is closed by controlling the return flow switching door 80 by the electric actuator 91. At this time, when there is the exhaust heat door 82, the exhaust heat door 82 is closed.

Accordingly, the shutter 50 closes the air passage 41, and the return flow switching door 80 closes the air outlet 2a. Thus, the discharge of exhaust heat of the propulsion engine 3 to the outside of the engine compartment 2 is reduced. At this time, the electric fan 10 rotates the fan in the reverse direction. Thus, the electric fan 10 blows out an air flow sucked from the propulsion engine 3 toward the radiator 20.

Thus, the electric fan 10 sucks the air flow heated by the exhaust heat of the propulsion engine 3, and blows out the sucked air flow toward the radiator 20 so that the air flow passes through the radiator 20. Accordingly, the heat from the air flow is recovered by the radiator 20 and transmitted to the propulsion engine 3 through the heating medium. Accordingly, the exhaust heat contained in the air flow accelerates the warming-up of the propulsion engine 3.

Figure 5B:
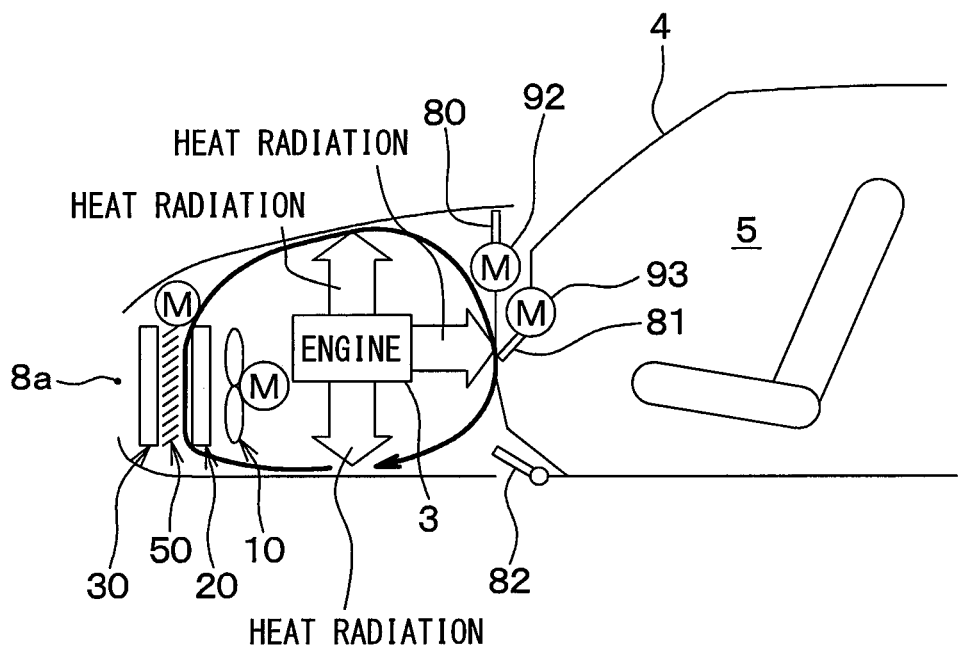
FIG. 5B is a schematic diagram for describing an operation during the execution of the heat recovery process.

In addition, the air flow blown from the electric fan 10 is prevented from flowing toward the front opening 8a by the shutter 50 and blown out to the upper side in the top-bottom direction through the air outlet 43 of the shroud 40. The blown out air flow flows to the rear side in the vehicle traveling direction along the engine hood 6. The air flow then flows to the rear side in the vehicle traveling direction with respect to the propulsion engine 3. Then, the air flow is sucked into the electric fan 10 through the periphery of the propulsion engine 3. Accordingly, a return air flow passing through the periphery of the radiator 20, the electric fan 10, and the propulsion engine 3 is generated. Thus, as illustrated in FIG. 5B, the air flow is heated by the exhaust heat of the propulsion engine 3, and heat is repeatedly transferred from the heated air flow to the propulsion engine 3 through the radiator 20. Then, the control ECU 90 returns to step S100.

Figure 4F:
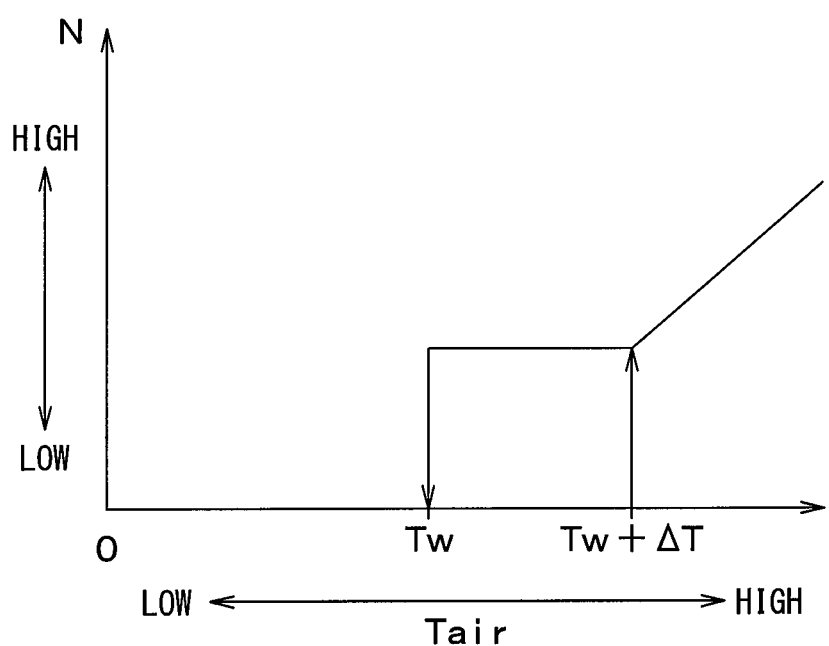
FIG. 4F is a control map illustrating a relationship between an air temperature Tair and a rotation speed N of an electric fan used in the warming-up acceleration process of FIG. 4B.

As illustrated in FIG. 4F, the control ECU 90 controls a rotation speed N of the fan of the electric fan 10 so that the heating medium temperature Tw approaches (the heating medium temperature Tw+$\Delta$T).

When the air temperature Tair is equal to or higher than (the heating medium temperature Tw+$\Delta$T), the rotation speed N of the fan is increased as the air temperature Tair increases. Thus, an air blowing amount of the electric fan 10 is increased as the air temperature Tair increases. Thus, the amount of air passing through the radiator 20 increases as the air temperature Tair increases. Accordingly, the amount of exhaust heat recovered by the radiator 20 increases as the air temperature Tair increases. Accordingly, the air temperature Tair approaches (the heating medium temperature Tw+$\Delta$T). That is, the difference between the air temperature Tair and the heating medium temperature Tw is maintained at $\Delta$T.

Further, when the air temperature Tair is less than (the heating medium temperature Tw+$\Delta$T) and equal to or higher than the heating medium temperature Tw, and the current rotation speed N of the fan is zero, the control ECU 90 proceeds to step S102 from step S101 to maintain the rotation speed N of the fan at zero as described above.

Further, when the air temperature Tair is lower than (the heating medium temperature Tw+$\Delta$T) and equal to or higher than the heating medium temperature Tw, and the current rotation speed N of the fan is larger than zero, the control ECU 90 may proceed to step S103 from step S101 to set the rotation speed N of the fan to a constant value. The constant value is equal to the rotation speed N of the fan when the air temperature Tair is equal to (the heating medium temperature Tw+$\Delta$T). In this case, it is determined whether the air temperature Tair is lower than the heating medium temperature Tw in step S101.

Further, when the air temperature Tair is lower than the heating medium temperature Tw, the control ECU 90 proceeds to step S102 from S101 to maintain the rotation speed N of the fan at zero.

Accordingly, in the increasing process of the air temperature Tair, the fan starts rotating at the point when the air temperature Tair becomes (the heating medium temperature Tw+$\Delta$T). Further, in the decreasing process of the air temperature Tair, the fan stops rotating at the point when the air temperature Tair becomes the heating medium temperature Tw. In this manner, hysteresis may be set in a response of the rotation speed N of the fan to the air temperature Tair.

In step S100 described above, when the heating medium temperature Tw is equal to or higher than the threshold T1, the control ECU 90 determines NO in step S100.

In this case, in step S104, the control ECU 90 determines whether the heating medium temperature Tw is lower than a threshold T2 on the basis of a detection value of the sensor 95 to determine whether the propulsion engine 3 is in a warming-up state. The threshold T2 is larger than the threshold>T1. The control ECU 90 corresponds to an exhaust heat determination section by executing step S104.

At this time, when the heating medium temperature Tw is lower than the threshold T2, the control ECU 90 determines that the propulsion engine 3 is in a warming-up state, that is, YES in step S104.

In this case, in step S105, the control ECU 90 determines whether the air temperature Tair is equal to or higher than the air temperature Tamb on the basis of detection values of the sensors 96, 97.

Accordingly, the control ECU 90 determines whether air inside the engine compartment 2 contains exhaust heat that can be used for the purpose of heating or defogging inside the cabin 5.

When the air temperature Tair is lower than the air temperature Tamb, the control ECU 90 determines that air inside the engine compartment 2 contains no exhaust heat that can be used for the purpose of heating or defogging inside the cabin 5, that is, NO in step S105. Then, the control ECU 90 proceeds to step S103.

On the other hand, when the air temperature Tair is equal to or higher than the air temperature Tamb, the control ECU 90 determines that air inside the engine compartment 2 contains exhaust heat that can be used for the purpose of heating or defogging inside the cabin 5, that is, YES in step S105. In this case, in step S106, the control ECU 90 executes a use process for using the exhaust heat for another purpose. The control ECU 90 corresponds to an airflow control section by executing step S106.

Specifically, the control ECU 90 closes the air passage 41 between the radiator 20 and the front opening 8a by controlling the shutter 50 by the electric actuator 91. The electric fan 10 is rotated in the reverse direction. The air outlet 2a of the engine compartment 2 is opened by controlling the return flow switching door 80 by the electric actuator 92. At this time, the exhaust heat door 82 may be opened or closed.

Accordingly, the shutter 50 closes the air passage 41, and the return flow switching door 80 opens the air outlet 2a. Thus, the exhaust heat of the propulsion engine 3 can be discharged to the outside of the engine compartment 2.

At this time, the electric fan 10 blows out an air flow sucked from the propulsion engine 3 toward the radiator 20. Thus, similarly to the heat recovery process of 103 described above, a return air flow passing through the periphery of the radiator 20, the electric fan 10, and the propulsion engine 3 is generated.

In addition, part of the air flow blown from the electric fan 10 is introduced into the air distribution destination duct 60 through the air outlet 2a of the engine compartment 2. The air flow introduced into the air distribution destination duct 60 is blown out through the shield blowout port 61 and the in-cabin introduction port 62.

The air flow blown out through the shield blowout port 61 flows along the outer surface of the front windshield 4. Thus, the temperature of the front windshield 4 increases.

Thus, it is possible to reduce fogging of the front windshield 4 using the exhaust heat of the propulsion engine 3.

Figure 5C:
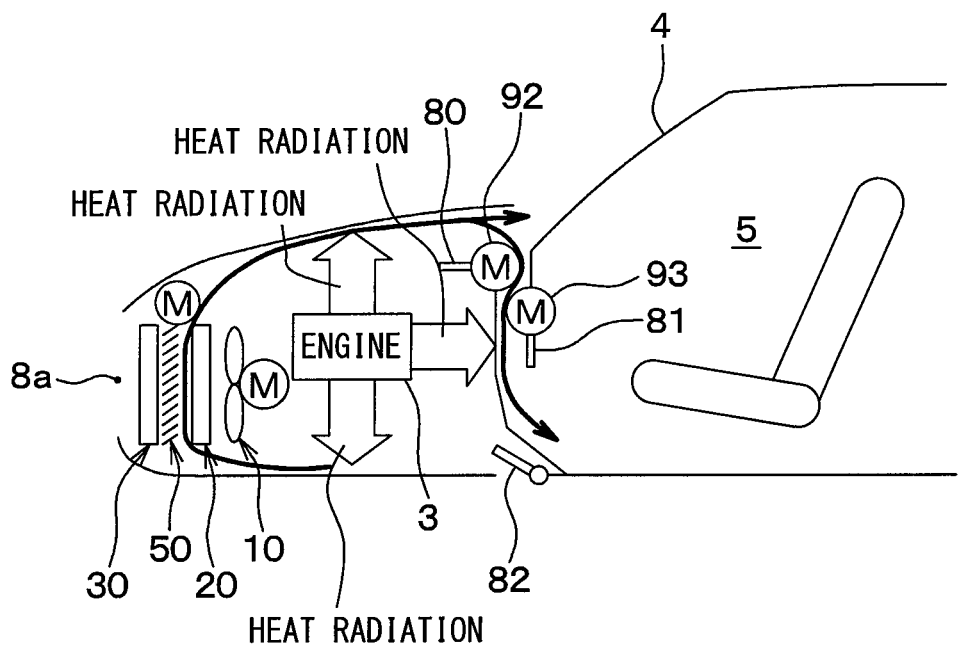
FIG. 5C is a schematic diagram for describing an operation during the execution of the heat use process.

In addition, as illustrated in FIG. 5C, the air flow is blown into the cabin 5 through the in-cabin introduction port 62, so that heating inside the cabin 5 is performed using the exhaust heat of the propulsion engine 3. Then, the control ECU 90 returns to step S100.

In step S104 described above, when the control ECU 90 determines that the heating medium temperature Tw is higher than the threshold T2, that is, NO on the basis of a detection value of the sensor 95, the control ECU 90 determines that the warming-up of the propulsion engine 3 is finished.

In the next step S107, the control ECU 90 determines whether the heating medium temperature Tw is higher than a threshold T3 on the basis of a detection value of the sensor 95 to determine whether heat inside the engine compartment 2 should be forcibly discharged. The threshold T3 is larger than the threshold T2. The control ECU 90 corresponds to the exhaust heat determination section by executing step S107.

At this time, when the heating medium temperature Tw is higher than the threshold T3, the control ECU 90 determines that the heat inside the engine compartment 2 should be forcibly discharged, that is, YES in step S107.

In this case, in step S108, the control ECU 90 opens the air passage 41 between the radiator 20 and the front opening 8a by controlling the shutter 50 by the electric actuator 91. The electric fan 10 is rotated in the normal direction. The air outlet 2a is closed by controlling the return flow switching door 80 by the electric actuator 92. The exhaust port 2b is opened by controlling the exhaust heat door 82 by the electric actuator 94. The control ECU 90 corresponds to the exhaust control section by executing step S108.

Accordingly, the electric fan 10 blows out an air flow sucked from the front side in the vehicle traveling direction through the front opening 8a, the condenser 30, the shutter 50, and the radiator 20 toward the propulsion engine 3. Thus, the blown out air flow passes through the periphery of the propulsion engine 3.

Figure 5D:
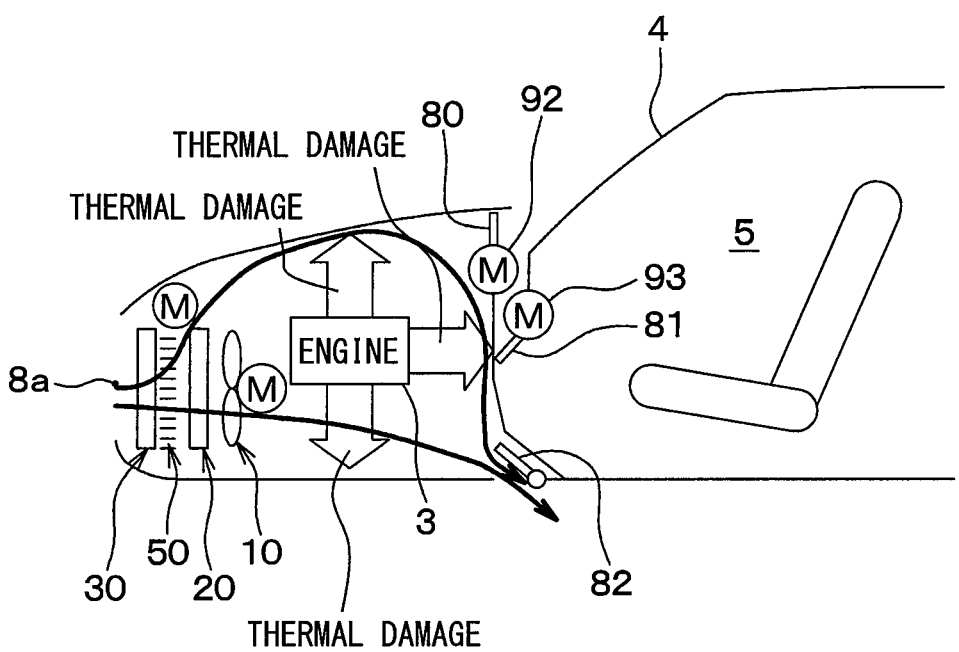
FIG. 5D is a schematic diagram for describing an operation during the execution of the thermal damage prevention process.

At this time, when the vehicle is traveling in the traveling direction, an air flow flows to the rear side in the vehicle traveling direction along the undercover 7 on the lower side in the vehicle top-bottom direction. Thus, an air pressure on the lower side in the top-bottom direction of the vehicle becomes lower than an air pressure inside the engine compartment 2. Accordingly, as illustrated in FIG. 5D, an air flow from the inside of the engine compartment 2 is sucked to the lower side in the top-bottom direction of the vehicle through the exhaust port 2b and flows to the outside of the vehicle. Then, the control ECU 90 returns to step S100.

Further, in step S107 described above, when the heating medium temperature Tw is lower than the threshold T3, the control ECU 90 determines that the heat inside the engine compartment 2 should not be forcibly discharged. In this case, in step S107, the control ECU 90 determines NO, that is, determines that air inside the engine compartment 2 contains exhaust heat that can be used for the purpose of heating or defogging inside the cabin 5. The control ECU 90 corresponds to the exhaust heat determination section by making the determination in this manner in step S107. Then, the control ECU 90 shifts to step S106.

The control ECU 90 performs any of the warming-up acceleration process of step S102, the heat recovery process of step S103, the heat use process of step S106, and the thermal damage prevention process of step S108 by repeatedly performing the processes of step S100 to step S108.

Figure 6:
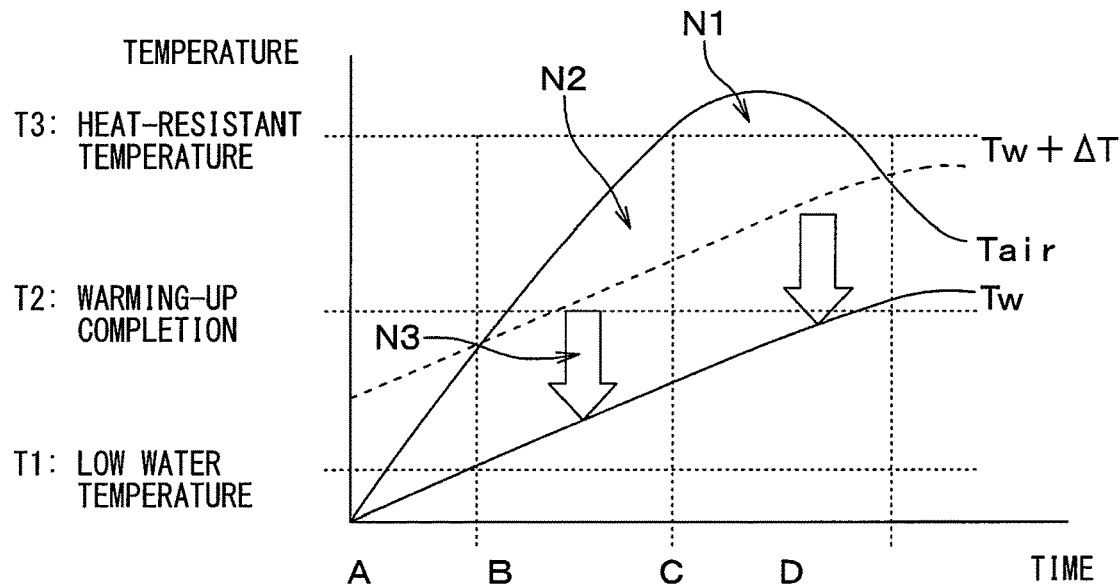
FIG. 6 is a diagram illustrating a relationship between an air temperature Tair (that is, the temperature inside an engine compartment) and a heating medium temperature Tw (that is, an engine water temperature) with a vertical axis representing time and a horizontal axis representing temperature in the first embodiment.

FIG. 6 illustrates the relationship between the air temperature Tair, the heating medium temperature Tw, and the thresholds T1, T2, and T3 of the present embodiment.

(A) When the air temperature Tair≥the heating medium temperature Tw, the hating medium temperature Tw<the threshold T1, and the air temperature Tair<the heating medium temperature Tw+ΔT, the warming-up acceleration process of step S102 is executed.

In this case, the discharge of exhaust heat of the propulsion engine 3 to the outside of the engine compartment 2 is reduced, which facilitates increasing the air temperature Tair inside the engine compartment 2. Accordingly, a warming-up time of the propulsion engine 3 can be reduced.

(B) When the air temperature Tair≥the heating medium temperature Tw, the threshold T1<the heating medium temperature Tw<the threshold T2, and the air temperature Tair<the air temperature Tamb, the heat recovery process of step S103 is executed. Alternatively, when the heating medium temperature Tw<the threshold T1 and the air temperature Tair (the heating medium temperature Tw+ΔT), the heat recovery process of step S103 is executed.

In the heat recovery process of step S103, the control ECU 90 controls the rotation speed of the fan of the electric fan 10 to control the volume of air passing through the radiator 20 to maintain the temperature difference between the air temperature Tair and the heating medium temperature Tw at ΔT. Accordingly, it is possible to efficiently recover the exhaust heat of the propulsion engine 3 to the heating medium through the radiator 20.

In such a scene, in a conventional technique, the use of the heating medium (that is, a warm water) for the purpose of air conditioning (that is, heating) inside the cabin 5 is limited to accelerate the warming-up of the propulsion engine 3. In the present embodiment, it is possible to use an air flow inside the engine compartment 2 that cannot be used in a conventional warm water recovery, the air flow having a temperature higher than the ambient temperature, for the purpose of air conditioning because the temperature of the engine cooling water increases in the heat recovery process of step S103. As the temperature of the engine cooling water increases, the temperature of a cooling water in a heater core of the air conditioner rises. Thus, air fed into the cabin by the air conditioner is heated by the heater core.

(C) Then, when the heating medium temperature Tw further increases and approaches the air temperature Tair, exhaust heat as a warm air that cannot be sufficiently recovered to the heating medium increases. Thus, an air conditioning system that wishes to use a warm air as it is can positively use the exhaust heat as a warm air.

That is, when the air temperature Tair≥the heating medium temperature Tw, the threshold T1<the heating medium temperature Tw<the threshold T2, and the air temperature Tair>the air temperature Tamb, the heat use process of step S104 is executed. Alternatively, when the air temperature Tair≥the heating medium temperature Tw, and the threshold T2<the heating medium temperature Tw<the threshold T3, the heat use process of step S106 is executed.

For example, the front windshield 4 during traveling in the winter is exposed to a cold traveling wind, and the temperature of a glass thus decreases. Thus, fogging of the front windshield 4 is prone to occur on the inner side of the cabin, for example, due to the occupant's breath. At this time, the exhaust heat air, which is discarded in a conventional technique, is fed to the open air side of the front windshield 4. Accordingly, it is possible to increase the temperature of the front windshield 4 to improve the defogging effect. The defogging effect can be improved because the warm air is used as it is.

(D) When the air temperature Tair≥the heating medium temperature Tw, and the heating medium temperature Tw>the threshold T3, the thermal damage prevention process of step S108 is executed.

When the air temperature Tair of the engine compartment 2 further increases and approaches a heat-resistant temperature T3 of devices inside the engine compartment 2, a failure of the devices occurs. In particular, the above temperature environment is a hostile temperature environment for a rubber component, a resin component, or a wire harness. It is possible to more effectively discharge heat to a required region in a required scene by controlling the air flow inside the engine compartment 2.

The threshold T1 is a threshold for determining whether the heating medium temperature Tw is a low water temperature. The threshold T2 is a threshold for determining whether the warming-up of the propulsion engine 3 has been completed. The threshold T3 is the heat-resistant temperature of the devices in the engine compartment 2.

In FIG. 6, N1 represents exhaust heat that is forcibly discharged to the outside of the vehicle from the inside of the engine compartment 2. N2 represents exhaust heat that is not recovered to the heating medium. N3 represents exhaust heat that is recovered to the heating medium.

According to the present embodiment described above, the airflow control system 1 includes the electric fan 10 and the return flow switching door 80. The electric fan 10 is disposed on the front side in the vehicle traveling direction with respect to the inside of the cabin 5 and disposed inside the engine compartment 2 which houses the propulsion engine 3. The return flow switching door 80 opens and closes the air outlet 2a through which an air flow from the inside of the engine compartment 2 is blown to another area on the rear side in the vehicle traveling direction with respect to the engine compartment 2.

The control ECU 90 determines whether air inside the engine compartment 2 contains exhaust heat of the propulsion engine 3 to be used in another area (that is, the area other than the engine compartment 2). When the control ECU 90 determines that air inside the engine compartment 2 contains exhaust heat of the propulsion engine 3 to be used in another area, the control ECU 90 controls the return flow switching door 80 so that the air outlet 2a is opened and controls the electric fan 10 so that an air flow containing the exhaust heat is blown to another area (e.g., the inside of the cabin 5 or the outer surface of the front windshield 4) through the air outlet 2a.

Accordingly, the air flow is blown into the cabin 5 or to the outer surface of the front windshield 4. Thus, exhaust heat that cannot be recovered by the radiator 20 can be used as a warm air for the purpose of heating or defogging other than warming-up of the propulsion engine 3.

In the present embodiment, when the electric fan 10 rotates the fan in the reverse direction, the return air flow passing through the periphery of the radiator 20, the electric fan 10, and the propulsion engine 3 is generated. Thus, the air flow is heated by the exhaust heat of the propulsion engine 3, and the exhaust heat is recovered from the heated air flow to the heating medium through the radiator 20, which is repeatedly performed. Thus, the exhaust heat of the propulsion engine 3 can be efficiently recovered to the heating medium.

The air distribution destination duct 60 of the present embodiment is disposed in the cowl area 70. The cowl area 70 originally includes a hole which communicates with the inside of the cabin 5 through a fire wall. Thus, the air flow can be blown into the cabin 5 from the air distribution destination duct 60 using the hole.

First Modification of First Embodiment

Figure 7:
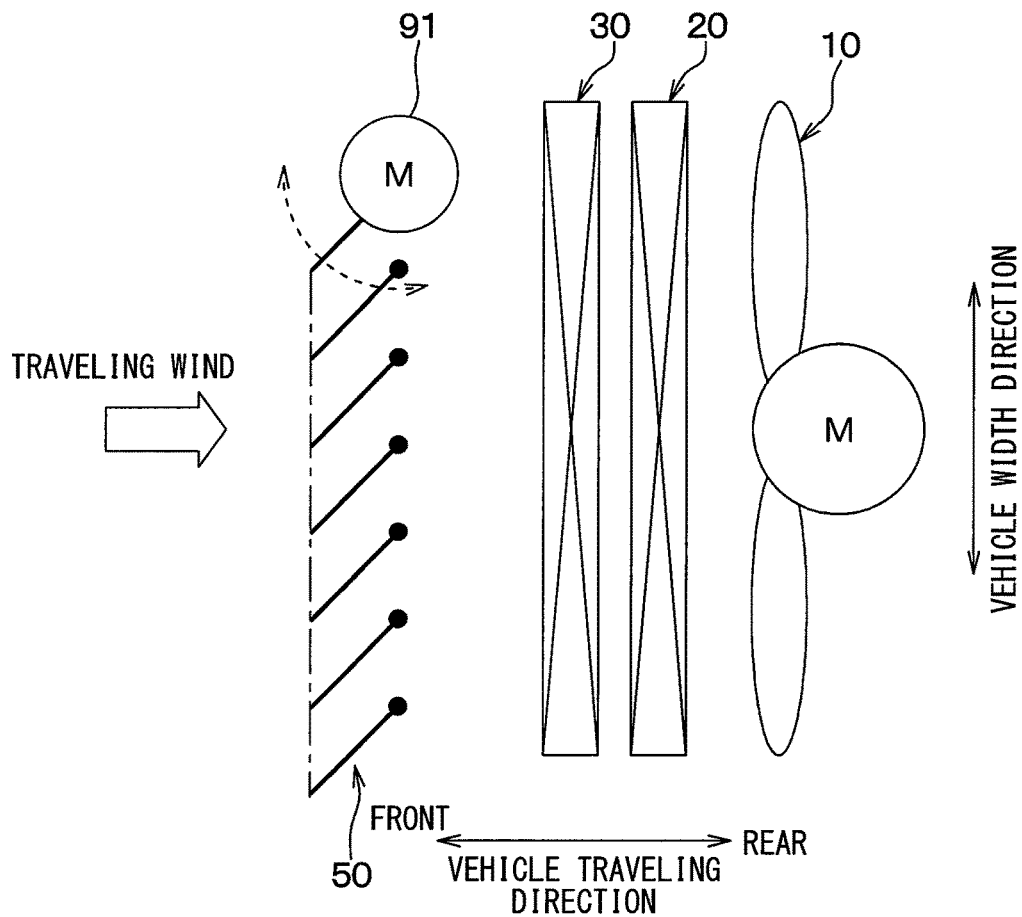
FIG. 7 is an arrangement diagram of an electric fan, a radiator, a condenser, and a shutter in a first modification of the first embodiment viewed from the upper side in the top-bottom direction.

The above first embodiment describes an example in which the shutter 50 is disposed between the radiator 20 and the condenser 30. Alternatively, as illustrated in FIG. 7, the shutter 50 may be disposed on the front side in the vehicle traveling direction with respect to the condenser 30.

That is, the shutter 50 is disposed between the condenser 30 and the front opening 8a. Further, the shutter 50 may be disposed inside the front opening 8a. In FIG. 7, the front opening 8a is not illustrated.

Second Modification of First Embodiment

The above first embodiment describes an example in which the shutter 50 is the opening and closing mechanism that opens and closes each of the plurality of doors arranged in a row by the electric actuator. Alternatively, the shutter 50 may be an opening and closing mechanism as illustrated in FIG. 8.

Figure 8:
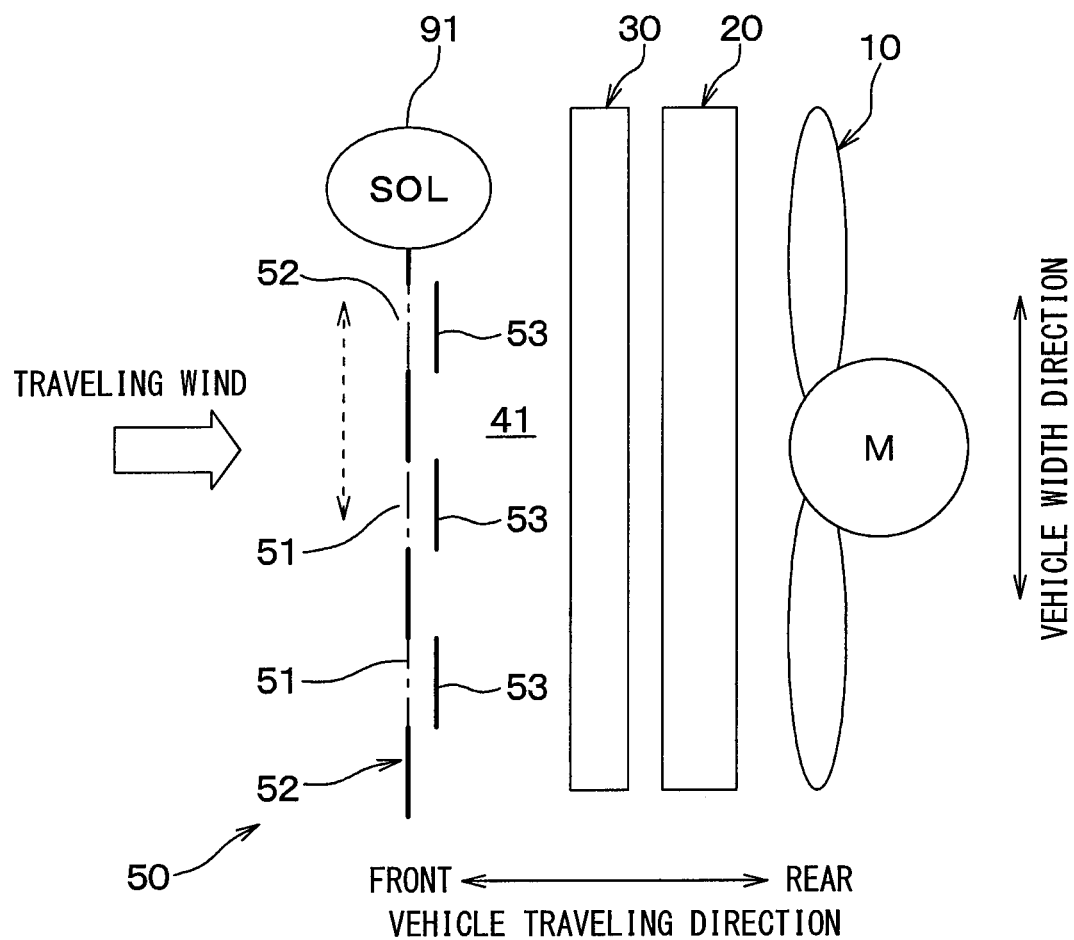
FIG. 8 is an arrangement diagram of an electric fan, a radiator, a condenser, and a shutter in a second modification of the first embodiment viewed from the upper side in the top-bottom direction.

The shutter 50 of FIG. 8 includes a slide door 52 which has a plurality of slits (that is, openings) 51 and a plurality of windshield plates 53 which are disposed in an air flowing direction with respect to the slits 51. In this case, an electromagnetic solenoid is used as the electric actuator 91 to slide the slide door 52 in a direction perpendicular to the direction of a traveling wind. The traveling wind refers to an air flow against the vehicle during traveling of the vehicle.

When each of the slits 51 closes the corresponding one of the windshield plates 53, the shutter 50 closes the air passage 41. On the other hand, when each of the slits 51 opens the corresponding one of the windshield plates 53, the shutter 50 opens the air passage 41.

In the present embodiment, the electric fan 10 blows an air flow with the air passage 41 between the front opening 8a and the electric fan 10 closed by the shutter 50. Thus, air inside the engine compartment 2 is blown to another area through the air outlet of the engine compartment 2. Thus, it is possible to reduce the entry of air outside the vehicle into the engine compartment 2 through the front opening 8a or the exit of exhaust heat to the outside of the vehicle through the front opening 8a.

Second Embodiment

A second embodiment describes an example in which the first embodiment includes a return flow duct 100 (that is, an introduction duct) for generating a return air flow inside the engine compartment 2.

Figure 9:
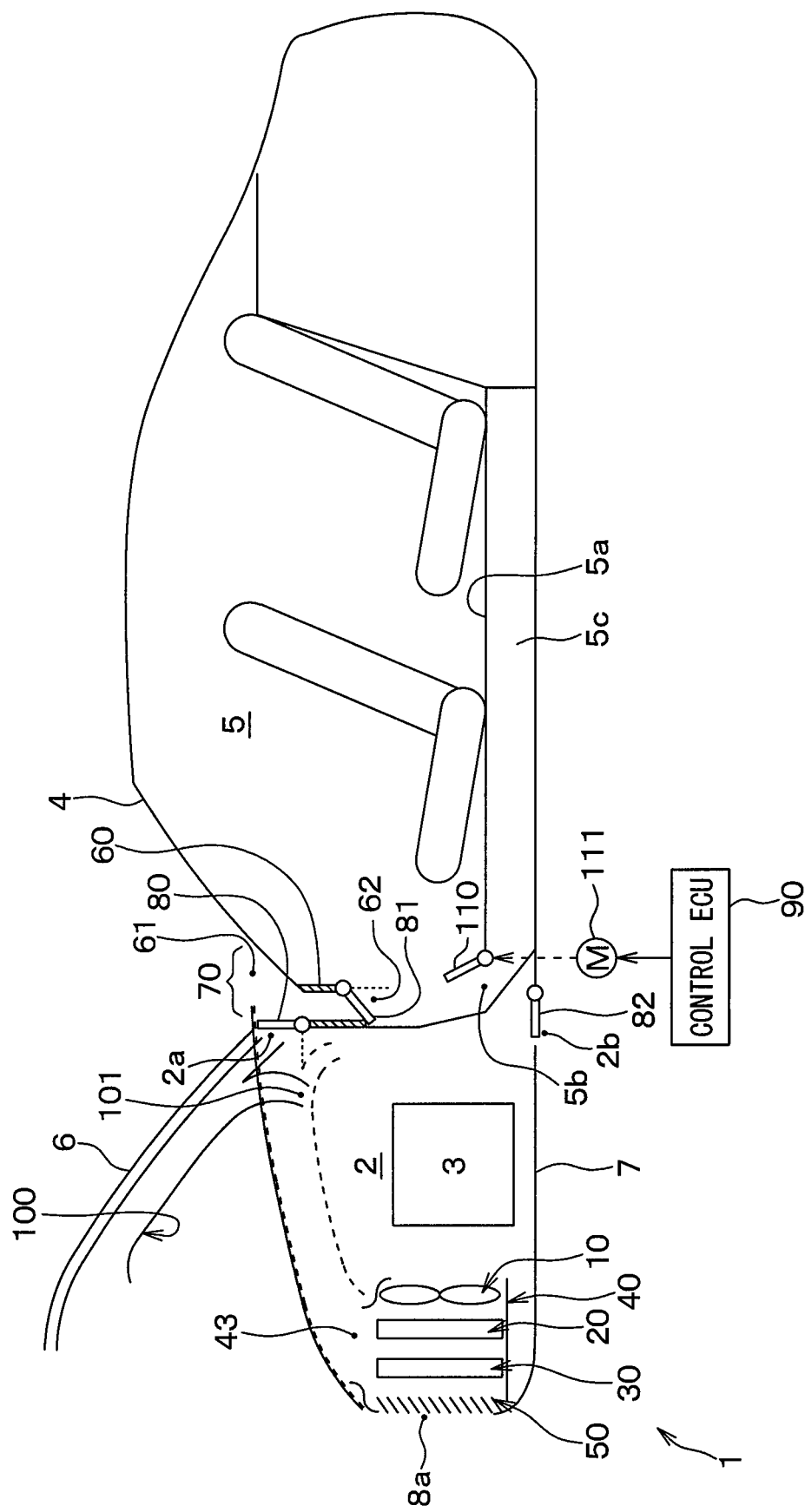
FIG. 9 is a diagram illustrating an entire configuration of an airflow control system in a second embodiment.

FIG. 9 illustrates a schematic configuration of an airflow control system 1 of the present embodiment. The airflow control system 1 of the present embodiment includes the return flow duct 100 and an underfloor door 110 in addition to the airflow control system 1 of the above first embodiment.

As described below, the return flow duct 100 is a duct for guiding an air flow so as to generate a return air flow.

Figure 10:
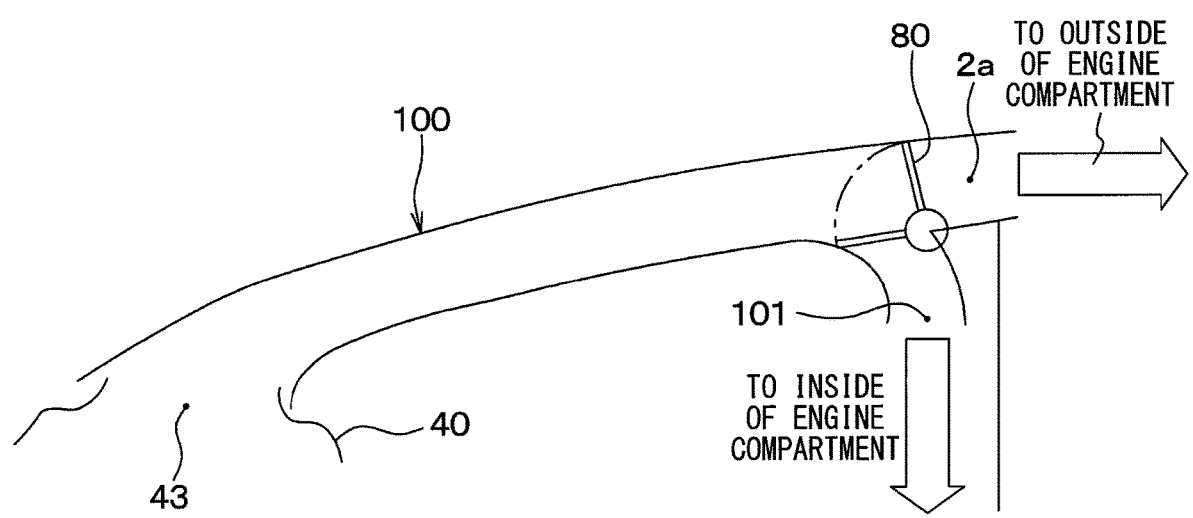
FIG. 10 is a diagram illustrating a return flow duct and a return flow switching door of FIG. 9.

Specifically, as illustrated in FIG. 10, the return flow duct 100 is formed for guiding an air flow blown out through an air outlet 43 of a shroud 40 to an air outlet 2a of an engine compartment 2 and a return flow outlet 101.

The return flow duct 100 is disposed on the lower side in the top-bottom direction with respect to an engine hood 6 in the engine compartment 2. The return flow duct 100 is supported by the engine hood 6.

The return flow outlet 101 is a blowout port for blowing out an air flow passing through the return flow duct 100 to the rear side in the vehicle traveling direction with respect to a propulsion engine 3 in the engine compartment 2. A return flow switching door 80 of the present embodiment opens either the air outlet 2a or the return flow outlet 101 and closes the other one.

The underfloor door 110 opens and closes an opening 5b of a floor 5a inside a cabin 5. The opening 5b allows the inside of the cabin 5 and an underfloor storage space 5c to communicate with each other. A secondary battery which supplies power to a traveling motor and the like is stored in the underfloor storage space 5c. The underfloor door 110 is opened and closed by an electric actuator 111. The electric actuator 111 is controlled by a control ECU 90.

In the present embodiment, similarly to the first modification of the first embodiment, a shutter 50 is disposed on the front side in the vehicle traveling direction with respect to a condenser 30 and disposed inside a front opening 8a.

Figure 11:
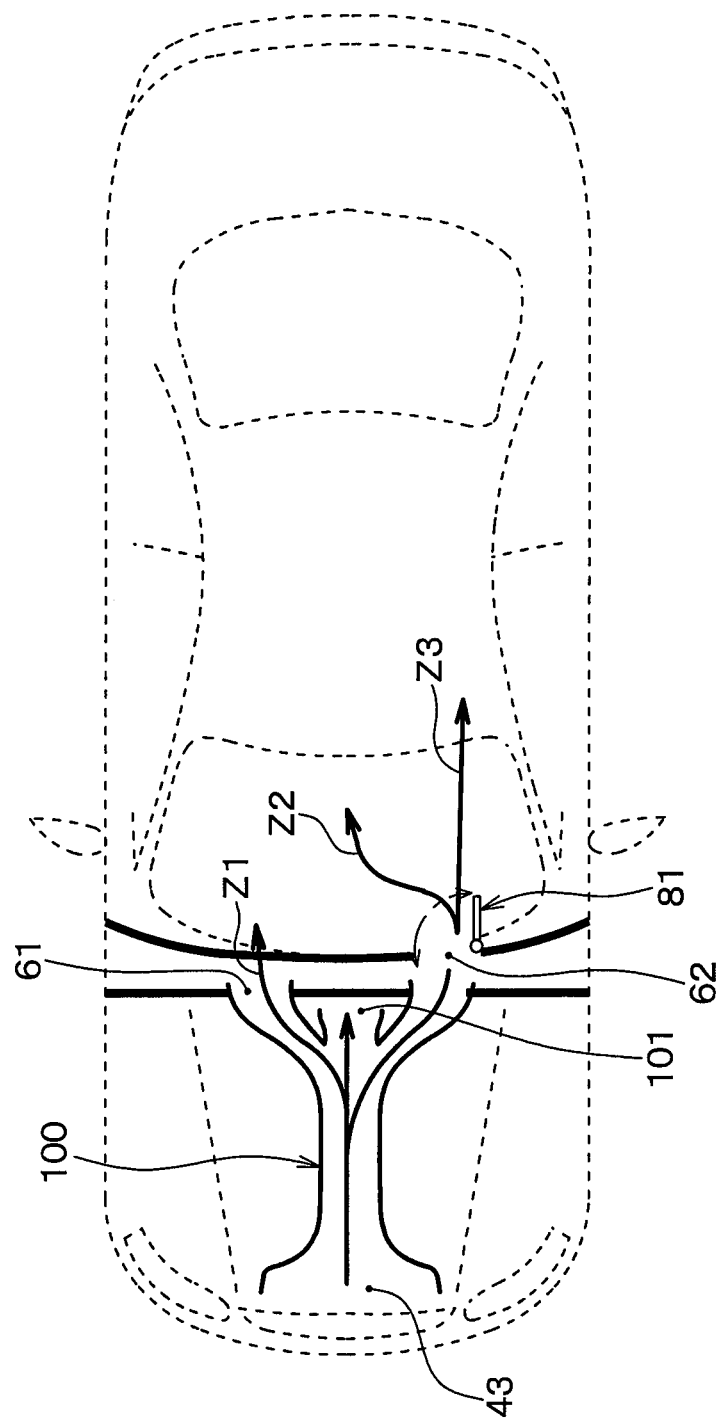
FIG. 11 is a schematic view of the airflow control system viewed from the upper side in the top-bottom direction in the second embodiment.

Next, the operation of the airflow control system 1 of the present embodiment will be described with reference to FIGS. 11 and 12.

First, an electric fan 10 blows out an air flow sucked from the propulsion engine 3 so that the air flow passes through the radiator 20. In addition, an air flow blown from the electric fan 10 through the air outlet 43 of the shroud 40 is blown out through the return flow outlet 101 to the rear side in the vehicle traveling direction with respect to the propulsion engine 3 through the return flow duct 100. Accordingly, the air flow blown out through the return flow outlet 101 generates a return air flow that is sucked into the electric fan 10 through the periphery of the propulsion engine 3.

Further, the control ECU 90 controls the return flow switching door 80 through an electric actuator 92 to open the air outlet 2a and close the return flow outlet 101. Further, the control ECU 90 controls an air distribution destination switching door 81 through an electric actuator 93 to open an in-cabin introduction port 62. Further, the control ECU 90 controls the underfloor door 110 through the electric actuator 111 to open the opening 5b of the floor 5a inside the cabin 5.

Figure 12:
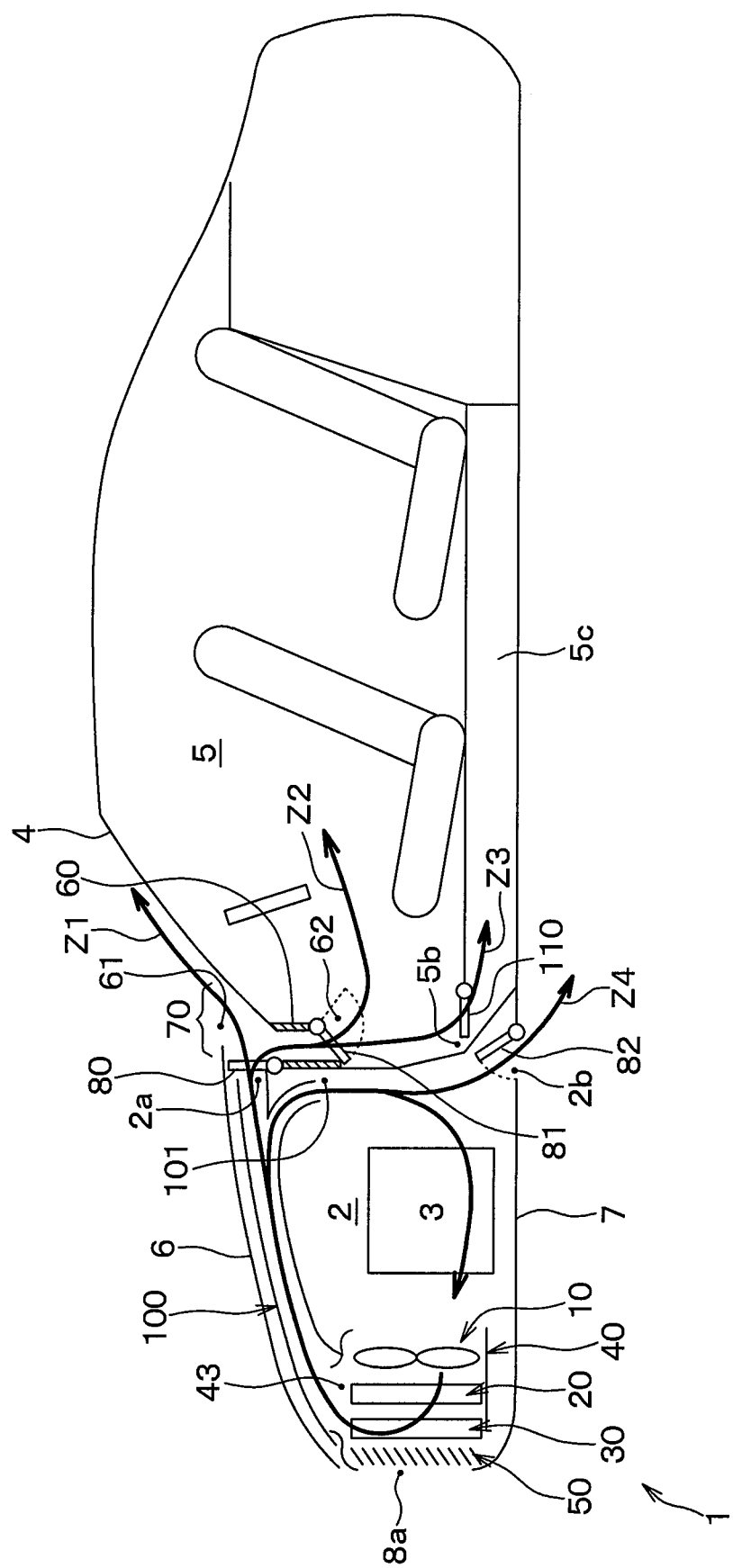
FIG. 12 is a schematic view of an air flow in the airflow control system of the second embodiment.

In this case, the air flow blown from the electric fan 10 through the air outlet 43 of the shroud 40 is blown into the cabin 5 through the air outlet 2a of the return flow duct 100 and the in-cabin introduction port 62 of an air distribution destination duct 60 as indicated by arrow Z2 in FIG. 12. Accordingly, the air flow flows from the inside of the cabin 5 to the underfloor storage space 5c through the opening 5b as indicated by arrow Z3. Thus, it is possible to increase the temperature of the secondary battery inside the underfloor storage space 5c.

Further, the air flow blown from the electric fan 10 through the air outlet 43 of the shroud 40 is blown out to the outer surface of a front windshield 4 through the air outlet 2a of the return flow duct 100 and a shield blowout port 61 of the air distribution destination duct 60 as indicated by arrow Z1.

According to the present embodiment described above, the air flow blown from the electric fan 10 using the return flow duct 100 is blown to the rear side in the vehicle traveling direction with respect to the propulsion engine 3 in the engine compartment 2. Thus, it is possible to guide the generation of a return air flow inside the engine compartment 2. Accordingly, the return air flow is easily generated inside the engine compartment 2.

In the present embodiment, it is possible to feed an air flow as a warm air from the inside of the cabin 5 to the underfloor storage space 5c through the opening 5b by opening the opening 5b of the floor 5a inside the cabin 5 by controlling the underfloor door 110. Thus, it is possible to increase the temperature of the secondary battery inside the underfloor storage space 5c.

In the present embodiment, when the control ECU 90 performs the thermal damage prevention process of step S108, a traveling wind during traveling of the vehicle flows into the vehicle from the front side in the vehicle traveling direction through the front opening 8a with the traveling of the vehicle. The flowed-in traveling wind is blown out through the return flow outlet 101 to the rear side in the vehicle traveling direction with respect to the propulsion engine 3 through the return flow duct 100.

Thus, in a vehicle that includes an exhaust manifold (that is, an exhaust duct) on the rear side in the vehicle traveling direction with respect to the propulsion engine 3 in the engine compartment 2, heat accumulated on the rear side of the propulsion engine 3 can be discharged through the exhaust port 2b as indicated by arrow Z4.

Further, the return flow outlet 101 of the return flow duct 100 is disposed near a main air flow in the engine compartment 2. Accordingly, it is possible to reduce pressure loss of the return flow duct 100 by the Coanda effect to effectively discharge heat.

The main air flow refers to an air flow having the largest air volume among a plurality of air flows flowing from the front opening 8a toward the propulsion engine 3 through the radiator 20 and the electric fan 10.

Further, when an opening is formed in a part having a negative pressure around the outside of the vehicle (e.g., the lower part of the vehicle) to discharge the main air flow to the outside of the vehicle through the opening, it is possible to effectively discharge heat from the inside of the engine compartment 2.

In these effects, the heating medium is not water, but air. Thus, even during traveling, the air can be taken into the vehicle from the outside of the vehicle and discharged to the outside of the vehicle as needed.

In the present embodiment, the return flow duct 100 is supported by the engine hood 6 and separable with respect to the shroud 40. As illustrated in FIG. 10, in a state in which the engine hood 6 covers the engine compartment 2, the return flow duct 100 and the shroud 40 are connected to each other. As illustrated in FIG. 9, in a state in which the engine hood 6 opens the engine compartment 2, the return flow duct 100 and the shroud 40 are separated from each other. Thus, it is possible to easily perform inspection and maintenance of apparatuses under the return flow duct 100.

First Modification of Second Embodiment

The above first and second embodiments describe an example in which the electric fan 10 is rotated in the reverse direction to generate a return air flow. Alternatively, in a first modification of the second embodiment, an electric fan 10b which is independent of the electric fan 10 is used to generate a return air flow. The first modification of the second embodiment will be described below.

Figure 13A:
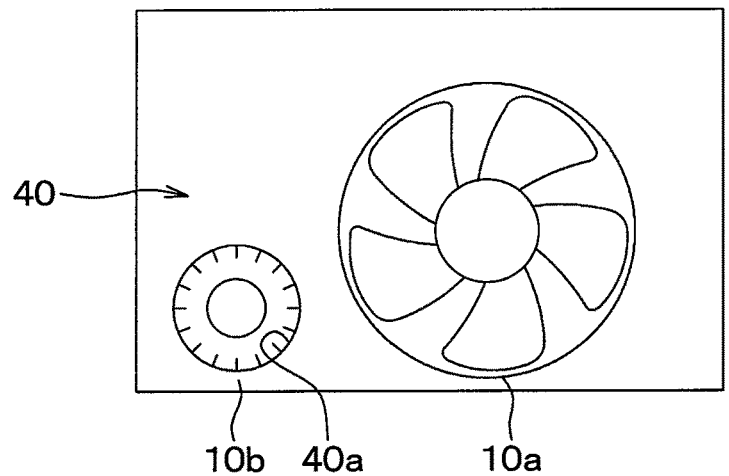
FIG. 13A is a diagram of a main electric fan and a sub electric fan in a second modification of the second embodiment viewed from the rear side in the vehicle traveling direction.

In the first modification, in order to clearly distinguish between the electric fan 10 and the electric fan 10b for convenience, as illustrated in FIG. 13A, the electric fan 10 is referred to as a main electric fan 10a, and the electric fan 10b is referred to as a sub electric fan 10b. The main electric fan 10a corresponds to a main air blower, and the sub electric fan 10b corresponds to a sub air blower.

The sub electric fan 10b is disposed on the right side or the left side in the vehicle width direction with respect to the main electric fan 10a. The sub electric fan 10b is supported by the shroud 40 together with the main electric fan 10a. The sub electric fan 10b includes, for example, a centrifugal fan and an electric motor which rotates the centrifugal fan.

The sub electric fan 10b blows out an air flow sucked from the radiator 20 through the opening 40a of the shroud 40. The opening 40a of the shroud 40 penetrates the shroud 40 in the vehicle traveling direction.

A return flow duct 100 of the first modification is formed for guiding the air flow blown from the sub electric fan 10b to the air outlet 2a of the engine compartment 2 and the return flow outlet 101.

In the first modification, when the control ECU 90 executes the warming-up acceleration process of step S102, the main electric fan 10a and the sub electric fan 10b are individually stopped.

When the control ECU 90 executes the heat recovery process of step S103, the main electric fan 10a is stopped, and the sub electric fan 10b is rotated.

Figure 13B:
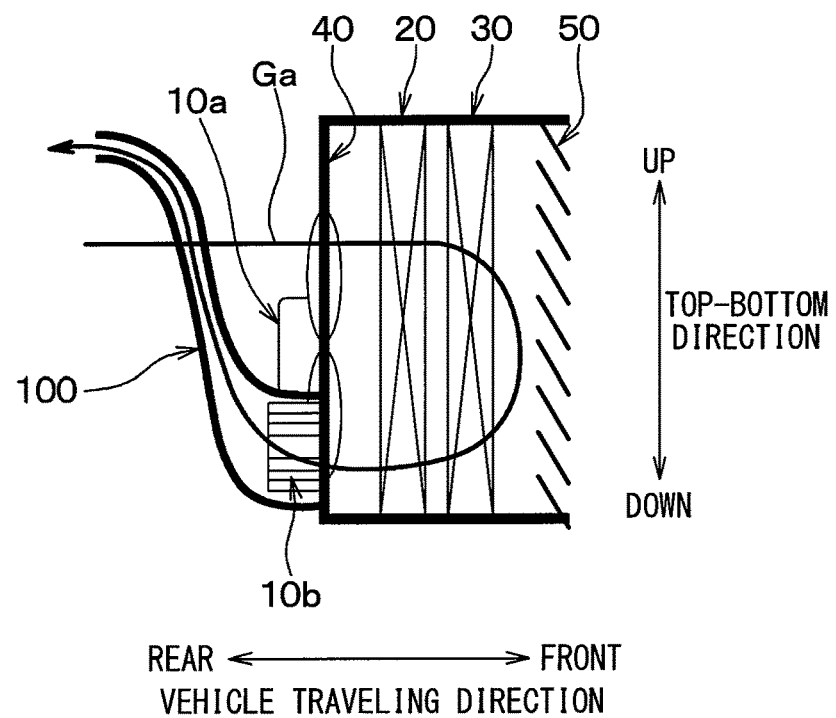
FIG. 13B is a diagram of an air flow in the second modification of the second embodiment viewed in the vehicle width direction.

At this time, the shutter 50 closes the air passage 41, and the return flow switching door 80 closes the air outlet 2a. Thus, the sub electric fan 10b introduces an air flow sucked from the propulsion engine 3 and blows the introduced air flow into the return flow duct 100 as indicated by arrow Ga of FIG. 13B.

When the air flow from the propulsion engine 3 is introduced into the sub electric fan 10b, the air flow flows through the main electric fan 10a, the radiator 20, the condenser 30, the radiator 20, and the sub electric fan 10b in this order. Thus, waste heat contained in the air flow from the propulsion engine 3 is recovered by the radiator 20.

Thus, the sub electric fan 10b introduces the air flow sucked from the propulsion engine 3 and blows the introduced air flow into the return flow duct 100 as indicated by arrow Ga. Thus, the air flow flows to the rear side in the vehicle traveling direction with respect to the propulsion engine 3 through the return flow outlet 101 of the return flow duct 100. Then, the air flow is sucked into the electric fan 10 through the periphery of the propulsion engine 3. Accordingly, a return air flow passing through the periphery of the radiator 20, the electric fan 10, and the propulsion engine 3 is generated.

When the control ECU 90 executes the heat use process of step S106, the control ECU 90 stops the main electric fan 10a and rotates the sub electric fan 10b.

At this time, similarly to the heat recovery process of step S103, the sub electric fan 10b introduces an air flow sucked from the propulsion engine 3 through the main electric fan 10a and blows the introduced air flow into the return flow duct 100 as indicated by arrow Ga. The air flow introduced into the return flow duct 100 is blown out through the shield blowout port 61 and the in-cabin introduction port 62 through the air distribution destination duct 60.

When the control ECU 90 executes the thermal damage prevention process of step S108, the control ECU 90 stops the sub electric fan 10b and rotates the main electric fan 10a in the normal direction.

The main electric fan 10a blows out an air flow sucked from the front side in the vehicle traveling direction through the front opening 8a, the condenser 30, the shutter 50, and the radiator 20 toward the propulsion engine 3. Thus, the blown out air flow passes through the periphery of the propulsion engine 3.

Then, the air flow from the inside of the engine compartment 2 is sucked to the lower side in the top-bottom direction of the vehicle through the exhaust port 2b and flows to the outside of the vehicle.

According to the first modification described above, the control ECU 90 controls the sub electric fan 10b so that the sub electric fan 10b introduces an air flow sucked from the propulsion engine 3 through the main electric fan 10a and blows the introduced air flow into the return flow duct 100. The air flow introduced into the return flow duct 100 is blown out through the shield blowout port 61 and the in-cabin introduction port 62 through the air distribution destination duct 60. Thus, the air flow containing waste heat can be used in heating inside the cabin 5 and defogging of the front windshield 4.

Third Embodiment

A third embodiment describes an example in which a blowout destination is switched on the basis of, for example, a target blowout temperature TAO in the second embodiment.

A control ECU 90 of the present embodiment controls electric actuators 91, 92, 94 on the basis of a communication signal from an air conditioning ECU 160 of an indoor air conditioning unit 120 and an in-cabin temperature Tr.

Figure 14:
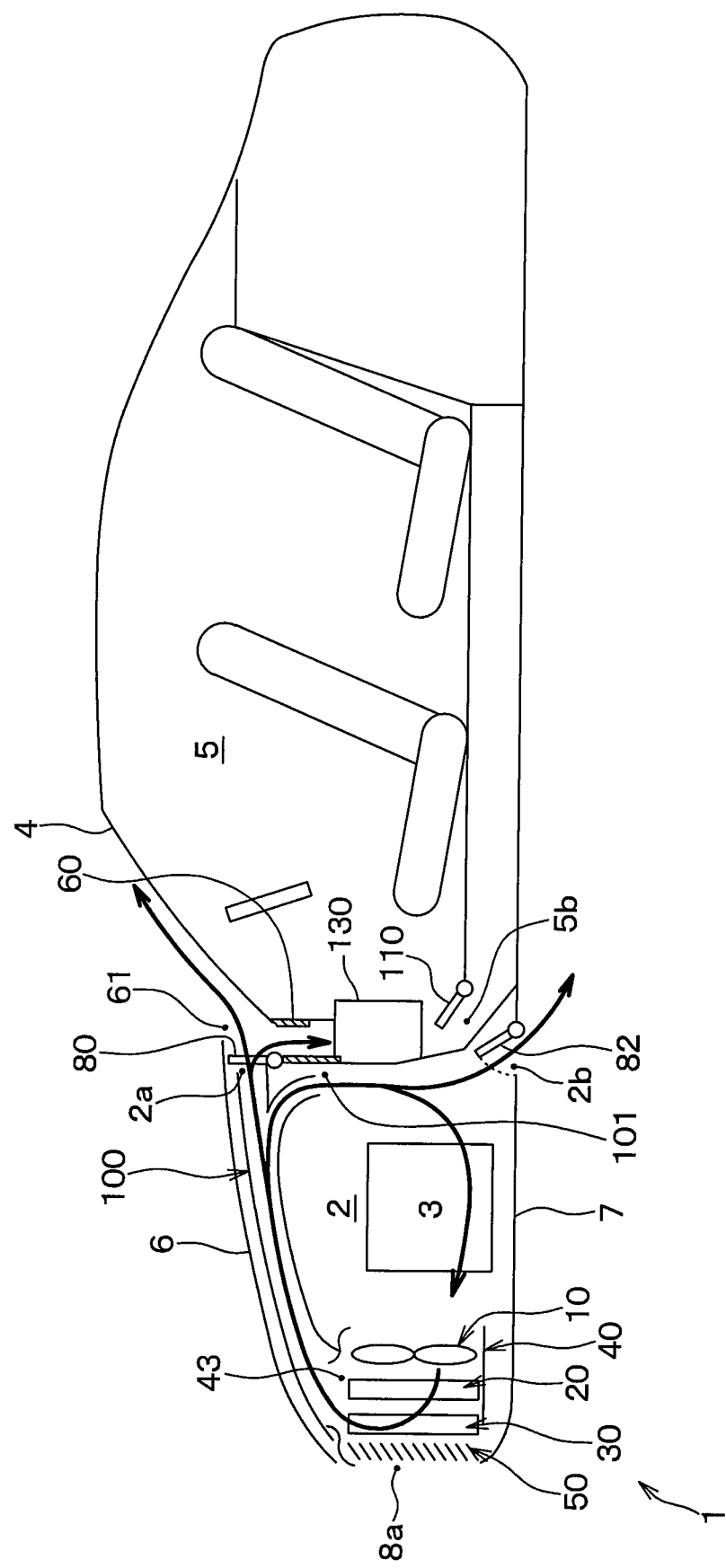
FIG. 14 is a diagram illustrating an entire configuration of an airflow control system in a third embodiment.
Figure 15:
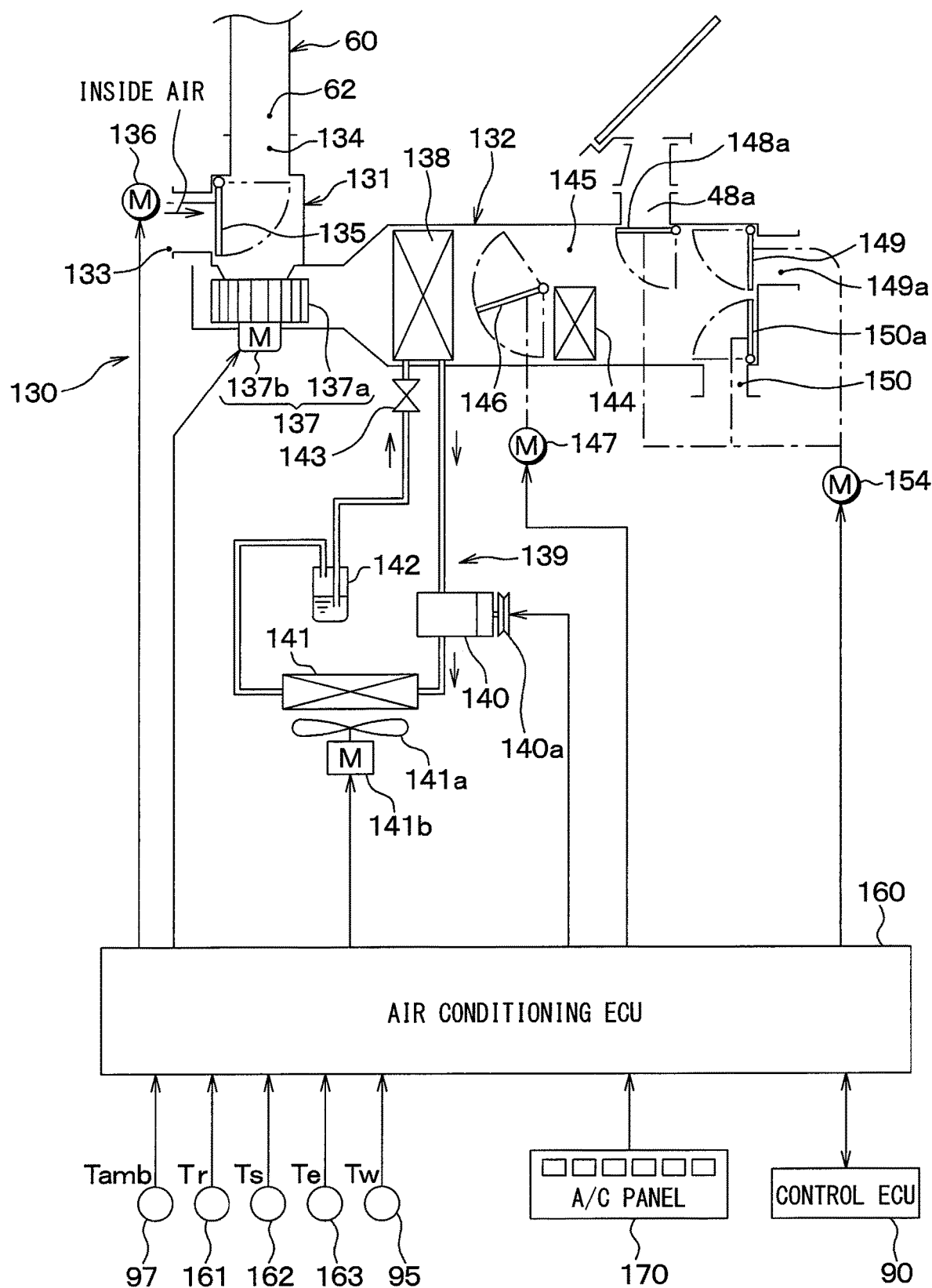
FIG. 15 is a diagram illustrating a configuration of an indoor air conditioning unit in the third embodiment.

Hereinbelow, prior to describing a control process of the control ECU 90 of the present embodiment, the indoor air conditioning unit 120 will be described with reference to FIGS. 14 and 15.

The indoor air conditioning unit 130 includes an inside and outside air switching box 131 and a case 132. The inside and outside air switching box 131 is disposed on the most upstream part of an air passage 41 of the case 132. An inside and outside air switching door 135 opens and closes an inside air introduction port 133 and an outside air introduction port 134 in a switching manner. The inside and outside air switching door 135 is driven by a servomotor 136.

An electric air blower 37 is disposed on the downstream side of the inside and outside air switching box 131. The air blower 37 blows air toward the inside of the cabin. In the air blower 137, a centrifugal blower fan 137a is driven by a motor 137b. An evaporator 138 is disposed on the downstream side of the air blower 137. The evaporator 138 serves as a cooling heat exchanger which cools a blown air.

The evaporator 138 is one of elements that constitute a refrigeration cycle apparatus 139. In the evaporator 138, a refrigerant having a low temperature and a low pressure absorbs heat from a blown air and evaporates to cool the blown air. The refrigeration cycle apparatus 139 is a known apparatus. The refrigeration cycle apparatus 139 is configured in such a manner that the refrigerant is circulated from the discharged side of a compressor 140 to the evaporator 38 through a condenser 141, a liquid receiver 142, and an expansion valve 143 which serves as a pressure reducer. An outdoor air (that is, a cooling air) is blown to the condenser 141 by an electric cooling fan 141a. The cooling fan 141a is driven by a motor 141b.

In the refrigeration cycle apparatus 139, the compressor 140 is driven by the propulsion engine 3 through an electromagnetic clutch 140a. Thus, the operation of the compressor 140 can be intermittently controlled by intermittent energization of the electromagnetic clutch 140a.

In the indoor air conditioning unit 130, a heater core 144 which heats air flowing inside the case 132 is disposed on the downstream side of the evaporator 138. The heater core 144 is a heating heat exchanger which heats air that has passed through the evaporator 138 (that is, a cool air) using a heating medium that cools the propulsion engine 3 (that is, an engine cooling water) as a heat source. A bypass passage 145 is formed beside the heater core 144. A bypass air of the heater core 144 flows through the bypass passage 145.

An air mix door 146 which serves as a temperature regulator is rotatably disposed between the evaporator 138 and the heater core 144. The air mix door 146 is driven by a servomotor 147. A rotation position of the air mix door 146 is continuously adjustable.

The ratio between the volume of air that passes through the heater core 144 and the volume of air that passes through the bypass passage 145 and bypasses the heater core 144 is adjusted by the degree of opening of the air mix door 146 to regulate the temperature of air blown into the cabin.

Three types of blowout ports in total including a defroster blowout opening 148, a face blowout opening 149, and a foot blowout port 150 are disposed on the most downstream part of the air passage 41 of the case 132.

That is, the case 132 includes opening forming parts 148a, 149a, 150a which form the defroster blowout opening 148, the face blowout opening 149, and the foot blowout port 150, respectively. Doors 151, 152, 153 are rotatably disposed on the upstream parts of the blowout openings 48 to 50. The doors 151 to 153 are opened and closed by a common servomotor 154 through a link mechanism (not illustrated).

The air conditioning ECU 160 is an electronic control apparatus that includes a known microcomputer including a CPU. Detection signals from an air conditioning sensor group 95, 97, and 161 to 163 and various operation signals from an air conditioning operation panel 170 are input to the air conditioning ECU 160.

The air conditioning sensor group includes the temperature sensor 97 which detects an ambient temperature Tamb, the temperature sensor 161 which detects an in-cabin temperature Tr, a solar radiation sensor 162 which detects a solar radiation amount Ts into the cabin, an evaporator temperature sensor 163 which is disposed on an air blowout part of the evaporator 138 to detect an evaporator blowout air temperature Te, and a water temperature sensor 95 which detects a temperature Tw of a heating medium flowing into the heater core 144. The air conditioning operation panel 170 includes a temperature setting switch which sets an in-cabin setting temperature Tset.

An in-cabin introduction port 62 of an air distribution destination duct 60 of the present embodiment is connected to the outside air introduction port 134 of the inside and outside air switching box 131.

In the present embodiment, the air distribution destination switching door 81 of the first embodiment is eliminated. The inside and outside air switching door 135 also serves as an air distribution destination switching door 81 for opening and closing the in-cabin introduction port 62.

Next, the operation of the airflow control system 1 of the present embodiment will be described.

Figure 16A:
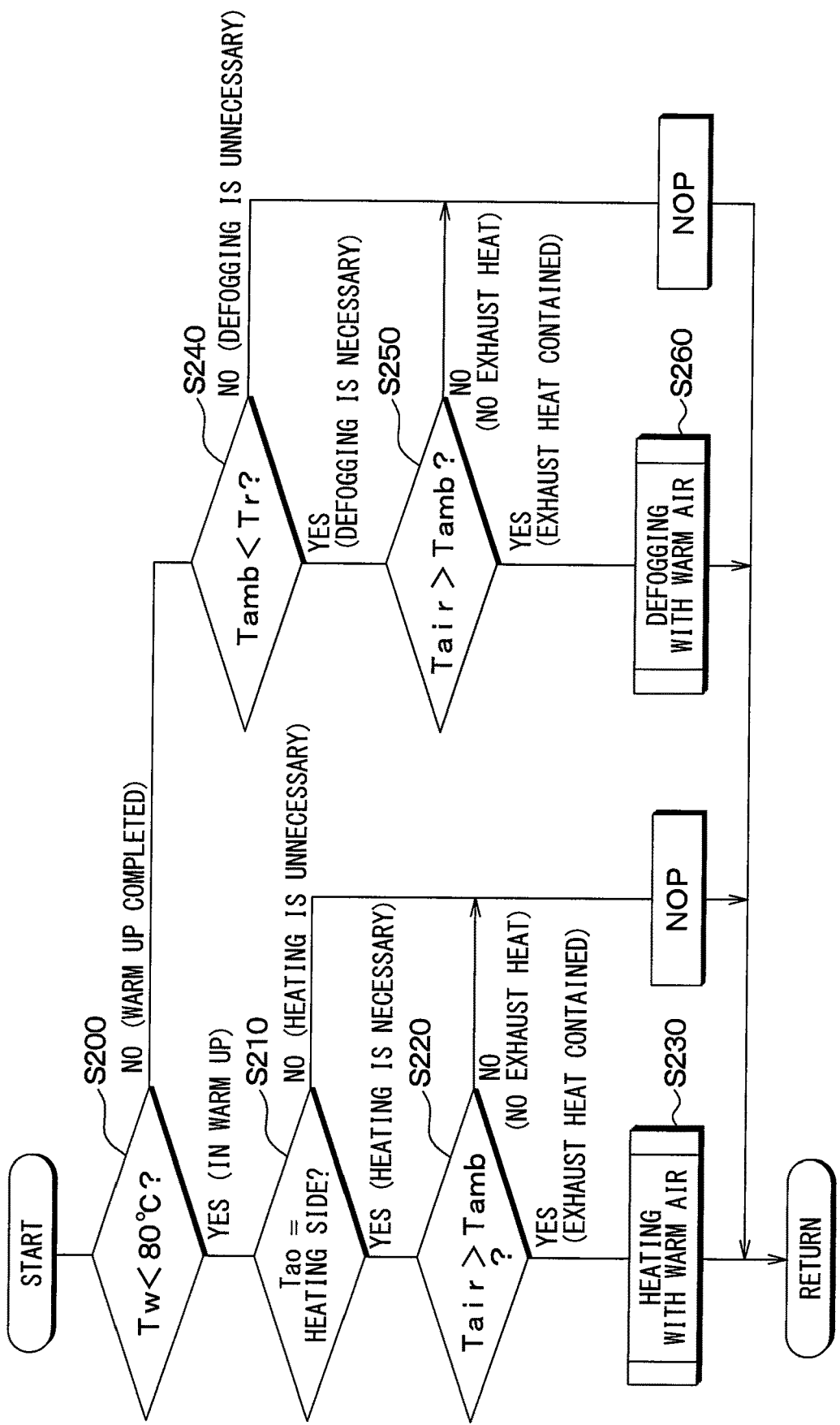
FIG. 16A is a flowchart illustrating a heating/defogging switching process of a control ECU in the third embodiment.
Figure 16B:
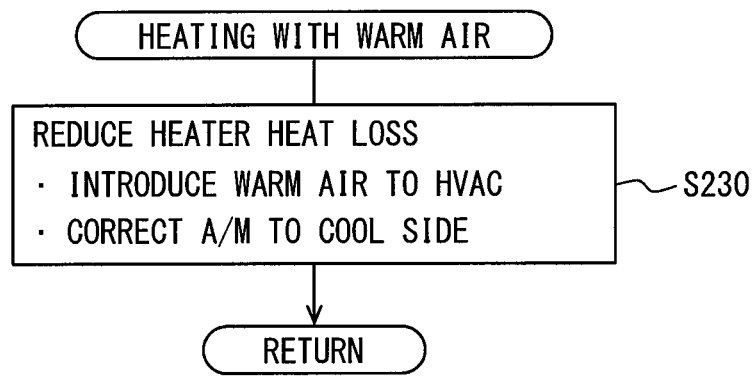
FIG. 16B is a flowchart illustrating the details of step S230 in FIG. 16A.
Figure 16C:
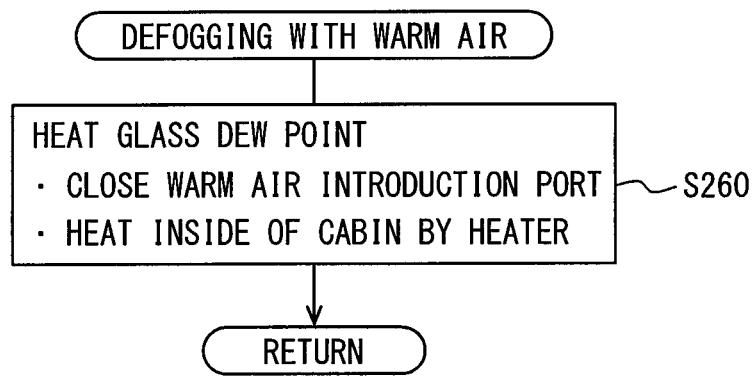
FIG. 16C is a flowchart illustrating the details of step S260 in FIG. 16A.

The control ECU 90 executes a heating/defogging switching process in accordance with flowcharts of FIGS. 16A, 16B, and 16C.

First, in step S200, the control ECU 90 determines whether the heating medium temperature Tw is lower than 80° C. on the basis of a detection value of the sensor 95. Accordingly, it is determined whether heating can be performed by the heater core 144.

When the heating medium temperature Tw is lower than 80° C., it is determined that the heating medium is in a warm-up state, and the temperature of the heating medium is insufficient. In this case, it is determined that heating cannot be performed by the heater core 144, that is, the control ECU 90 determines YES in step S200.

Next, in step S210, the control ECU 90 determines whether the target blowout temperature TAO is equal to or higher than a predetermined value to determine whether heating inside the cabin 5 is necessary. The control ECU 90 corresponds to a heating determination section by executing step S210.

The target blowout temperature TAO is a target value that is calculated by the air conditioning ECU 160 on the basis of the ambient temperature Tamb, the in-cabin temperature Tr, and the solar radiation amount Ts. The target blowout temperature TAO is the air temperature that needs to be blown out through the opening forming parts 148a, 149a, 150a in order to maintain the in-cabin temperature Tr at the in-cabin setting temperature Tset.

At this time, when the target blowout temperature TAO is equal to or higher than the predetermined value, it is determined that heating inside the cabin 5 is necessary, that is, the control ECU 90 determines YES in step S210.

Then, in step S220, the control ECU 90 determines whether the air temperature Tair is higher than the air temperature Tamb on the basis of detection values of the sensors 96, 97.

Accordingly, it is determined whether air inside the engine compartment 2 contains exhaust heat that can be used in heating inside the cabin 5.

At this time, when the air temperature Tair is higher than the air temperature Tamb, the control ECU 90 determines YES in step S220. In this case, it is determined that the air inside the engine compartment 2 contains exhaust heat that can be used in heating inside the vehicle cabin 5.

In this case, the control ECU 90 executes control for heating the inside of the cabin 5 in step S230. Specifically, the control ECU 90 controls the return flow switching door 80 through the electric actuator 92 to open the air outlet 2a of the engine compartment 2 and close the return flow outlet 101.

Then, the control ECU 90 rotates the electric fan 10 in the reverse direction. In addition, the control ECU 90 controls the servomotors 136, 147 through the air conditioning ECU 160. The control ECU 90 corresponds to a heating control section by executing step 230.

When the control ECU 90 controls the servomotor 136 through the air conditioning ECU 160, the inside and outside air switching door 135 closes the inside air introduction port 133 and opens the outside air introduction port 134.

When the control ECU 90 controls the servomotor 147 through the air conditioning ECU 160, the control ECU 90 causes the air mix door 146 to fully close the air inlet side or the air outlet side of the heater core 144 to fully open the bypass passage 45.

Thus, the electric fan 10 sucks an air flow containing exhaust heat from the propulsion engine 3 and blows out the sucked air flow to the outside air introduction port 134 of the inside and outside air switching box 131 through the air outlet 43 of the shroud 40, the return flow duct 100, and the in-cabin introduction port 62 of the air distribution destination duct 60.

The blown out air flow is sucked by the air blower 137 and blown out from the air blower 137. The blown out air flow is blown into the cabin through the opening forming parts 148a, 149a, 150a after passing through the evaporator 138 and the bypass passage 45. Accordingly, heating inside the cabin 5 is performed with the exhaust heat contained in the air inside the engine compartment 2. Then, the control ECU 90 returns to step S200.

Further, in step S210 described above, when the target blowout temperature TAO is lower than the predetermined value, the control ECU 90 determines that heating inside the cabin 5 is unnecessary, that is, NO. In this case, the control ECU 90 returns to step S200 without executing the heating control of step S230 and defogging control of step S260.

Further, in step S200 described above, when the heating medium temperature Tw is equal to or higher than 80° C., the control ECU 90 determines that the warm-up of the heating medium has been completed. In this case, the control ECU 90 determines that heating by the heater core 144 can be performed, that is, NO in step S200.

In this case, in the next step S240, the control ECU 90 determines whether the air temperature Tamb is lower than the in-cabin temperature Tr on the basis of detection values of the sensors 97, 161. Accordingly, it is determined whether defogging of the front windshield is necessary.

At this time, when the air temperature Tamb is lower than the in-cabin temperature Tr, the control ECU 90 determines that defogging of the front windshield is necessary, that is, YES in step S240.

Then, in step S250, the control ECU 90 determines whether the air temperature Tair is higher than the air temperature Tamb. Accordingly, it is determined whether air inside the engine compartment 2 contains exhaust heat that can be used in defogging. The control ECU 90 corresponds to a defogging determination section by executing step S250.

At this time, when the air temperature Tair is higher than the air temperature Tamb, the control ECU 90 determines that the air inside the engine compartment 2 contains exhaust heat that can be used in defogging, that is, YES in step S250.

Then, in step S260, the control ECU 90 executes control for defogging the front windshield 4. Specifically, the air outlet 2a of the engine compartment 2 is opened and the return flow outlet 101 is closed by controlling the return flow switching door 80 through the electric actuator 92. The electric fan 10 is rotated in the reverse direction. The control ECU 90 corresponds to a defogging control section by executing step S260.

In addition, the control ECU 90 controls the servomotors 136, 147 thorough the air conditioning ECU 160.

When the control ECU 90 controls the servomotor 136 through the air conditioning ECU 160, the inside and outside air switching door 135 opens the inside air introduction port 133 and closes the outside air introduction port 134.

When the control ECU 90 controls the servomotor 147 through the air conditioning ECU 160, the control ECU 90 causes the air mix door 146 to fully open the air inlet side or the air outlet side of the heater core 144 to fully close the bypass passage 145.

Thus, the electric fan 10 sucks an air flow containing exhaust heat from the propulsion engine 3 and blows out the sucked air flow to the outer surface of the front windshield 4 through the air outlet 43 of the shroud 40, the return flow duct 100, and the shield blowout port 61 of the air distribution destination duct 60.

The blown out air flow increases the temperature of the front windshield 4. Thus, it is possible to prevent the generation of dew on the inner surface of the front windshield 4.

In the indoor air conditioning unit 130, the air blower 137 sucks air inside the cabin (hereinbelow, referred to as an inside air) through the inside air introduction port 133 and blows out the sucked air toward the evaporator 138. The blown out air flow flows to the evaporator 138. At this time, the air flow is cooled by the refrigerant in the evaporator 138. Thus, a cold air is blown out from the evaporator 138. The cold air passes through the heater core 144. Thus, the cold air is heated by the heating medium in the heater core 144, and a warm air is blown out from the heater core 144. The warm air blown out in this manner is blown into the cabin through the opening forming parts 148a, 149a, 150a. Thus, the heater core 144 heats the inside of the cabin 5.

Further, in step S240 described above, when the air temperature Tamb is equal to or higher than the in-cabin temperature Tr, the control ECU 90 determines that defogging of the front windshield 4 is unnecessary, that is, NO. In this case, the control ECU 90 returns to step S200 without executing the heating control of step S230 and the defogging control of step S260.

In step S250 described above, when the air temperature Tair is lower than the air temperature Tamb, the control ECU 90 determines that air inside the engine compartment 2 contains no exhaust heat that can be used in defogging, that is, NO. In this case, the control ECU 90 returns to step S200 without executing the heating control of step S230 and the defogging control of step S260.

The control ECU 90 executes heating inside the cabin 5 or defogging of the front windshield 4 as needed by repeatedly performing the processes of steps S200 to S260 as described above.

According to the present embodiment described above, when the target blowout temperature TAO is equal to or higher than the predetermined value, the control ECU 90 determines that heating inside the cabin 5 is necessary and controls the air distribution destination switching door 81 through the electric actuator 93 to open the in-cabin introduction port 62. Thus, it is possible to blow a warm air into the cabin 5 through the in-cabin introduction port 62.

When the air temperature Tamb is lower than the in-cabin temperature Tr, the control ECU 90 determines that defogging of the front windshield is necessary and controls the air distribution destination switching door 81 through the electric actuator 93 to close the in-cabin introduction port 62. Thus, it is possible to blow a warm air to the outer surface of the front windshield 4 through the shield blowout port 61.

In this manner, the control ECU 90 is capable of switching the blowout destination to which a warm air is blown on the basis of the target blowout temperature TAO, the air temperature Tair, and the air temperature Tamb.

Other Embodiments (1) The above first, second, and third embodiments describe an example in which the propulsion engine 3 is an internal combustion engine that applies torque to the driving wheels of the vehicle. However, the propulsion engine 3 may be an internal combustion engine that generates power for driving a traveling electric motor.

(2) The above first, second, and third embodiments describe an example in which the air outlet 43 of the shroud 40 is open on the upper side in the top-bottom direction which is perpendicular to the vehicle traveling direction connecting the shutter 50 and the electric fan 10. Alternatively, the air outlet 43 of the shroud 40 may be open on the lower side in the top-bottom direction perpendicular to the vehicle traveling direction.

Alternatively, the air outlet 43 of the shroud 40 may be open on the right side (or the left side) in the vehicle width direction which is perpendicular to the vehicle traveling direction connecting the shutter 50 and the electric fan 10.

(3) The above first, second, and third embodiments describe an example in which the heat exchanger is the radiator 20 which performs heat exchange between the propulsion engine 3 and an air flow through the heating medium which is an engine cooling water. Alternatively, the heat exchanger may be an oil cooler which performs heat exchange between the propulsion engine 3 and an air flow through a heating medium which is oil.

(4) The above second and third embodiments describe an example in which an air flow blown out through the return flow outlet 101 of the return flow duct 100 is blown to the rear side in the vehicle traveling direction with respect to the propulsion engine 3. Alternatively, the following configuration may be employed.

Specifically, the air flow blown out through the return flow outlet 101 may be blown to any region within the front windshield 4 as long as the air flow that has passed through the return flow duct 100 and the electric fan 10 generates a return flow within the front windshield 4.

(5) The above first, second, and third embodiments describe an example in which the shutter 50 is opened and closed by the electric actuator 91. Alternatively, the shutter 50 may be manually opened and closed.

(6) The above second and third embodiments describe an example in which the air temperature Tair and the air temperature Tamb are compared to determine whether air inside the engine compartment 2 contains exhaust heat that can be used in heating or defogging. Alternatively, the following configuration may be employed.

Specifically, information other than the air temperature Tair and the air temperature Tamb may be used to determine whether air inside the engine compartment 2 contains exhaust heat that can be used for the purpose of heating or defogging inside the cabin 5.

(7) The above first, second, and third embodiments describe an example in which the airflow control system 1 is applied to the vehicle that includes the front opening 8a. Alternatively, the airflow control system 1 may be applied to a vehicle that does not include the front opening 8a.

The airflow control system 1 may be applied to a vehicle including a front opening 8a that is disposed not on the front damper, but on the engine hood 6.

(8) The above first, second, and third embodiments describe an example in which the airflow control system 1 is applied to the vehicle that includes the shutter 50. Alternatively, the airflow control system 1 may be applied to the vehicle that does not include the shutter 50.

(9) The above first embodiment describes an example in which the return flow switching door 80 closes the air outlet 2a in step S108. However, the present disclosure is not limited thereto. Opening and closing control of the return flow switching door 80 and the air distribution destination switching door 81 may be changed according to the type of a vehicle.

(10) The above third embodiment describes an example in which the air distribution destination switching door 81 is eliminated, and the inside and outside air switching door 135 opens and closes the outside air introduction port 134 to open and close the in-cabin introduction port 62 of the air distribution destination duct 60 instead of the air distribution destination switching door 81. Alternatively, the following configuration may be employed.

Specifically, the airflow control system 1 may be provided with both of the air distribution destination switching door 81 and the inside and outside air switching door 135.

(11) The present disclosure is not limited to the embodiments described above and can be modified in an appropriate manner. The above embodiments are not unrelated to each other and can be combined with each other in an appropriate manner unless the combination is clearly impossible. In each of the above embodiments, it is needless to say that the elements constituting the embodiment are not necessarily indispensable unless the elements are specifically stated as indispensable or the elements are regarded as obviously indispensable in principle. When a specific value such as the number of elements, a value, an amount, or a range is mentioned in each of the above embodiments, it should be understood that the present disclosure is not limited to the mentioned specific value unless the specific value is specifically stated as indispensable or the present disclosure is obviously limited to the specific value in principle. When the shape of an element or the positional relationship between elements is mentioned in each of the above embodiments, it should be understood that the present disclosure is not limited to the mentioned shape or positional relationship unless specifically stated or the present disclosure is limited to the specific shape or positional relationship in principle.

Overview

According to a first aspect described in some or all of the above first to third embodiments, the modifications, and the other embodiments, an airflow control system include:

an air blower that is disposed on a front side in a vehicle traveling direction with respect to an inside of a cabin and disposed inside an engine compartment that houses a propulsion engine; and an outlet door that opens and closes an air outlet through which an air flow from an inside of the engine compartment is blown to another area on a rear side in the vehicle traveling direction with respect to the engine compartment, and the air blower blows an air flow containing exhaust heat of the propulsion engine to the other area through the air outlet while the air outlet is opened by the outlet door.

According to a second aspect, the airflow control system includes:

an exhaust heat determination section that determines whether air inside the engine compartment contains exhaust heat of the propulsion engine to be used in the other area; and an airflow control section that, when the exhaust heat determination section determines that air inside the engine compartment contains exhaust heat of the propulsion engine to be used in the other area, controls the outlet door so that the air outlet is opened and controls the air blower so that an air flow containing the exhaust heat is blown to the other area through the air outlet.

Accordingly, an air flow containing exhaust heat can be automatically blown to the other area through the air outlet as needed.

According to a third aspect, the air blower sucks an air flow containing the exhaust heat from the propulsion engine and blows out the sucked air flow through the blowout port of the shroud with the first air passage between the front opening and the air blower closed by the shutter, and the blown out air flow is blown to the other area through the air outlet of the engine compartment.

Accordingly, it is possible to reduce the entry of air outside the vehicle into the engine compartment through the front opening or the exit of the exhaust heat through the front opening.

According to a fourth aspect, the airflow control system includes an air distribution destination duct that guides an air flow from the air outlet of the engine compartment to an in-cabin introduction port for blowing an air flow into the cabin as the other area.

According to a fifth aspect, the air distribution destination duct is formed for guiding an air flow from the air outlet of the engine compartment to a shield blowout port through which an air flow is blown to an outer surface of a front windshield as the other area.

According to a sixth aspect, the airflow control system includes an introduction port door that opens and closes the in-cabin introduction port of the air distribution destination duct.

According to a seventh aspect, the airflow control system includes an air conditioning unit that includes an inside and outside air switching door that opens either an inside air introduction port through which an air flow is introduced from the inside of the cabin or an outside air introduction port through which an air flow is introduced from the in-cabin introduction port of the air distribution destination duct, and that adjusts a temperature of an air flow introduced through either the inside air introduction port or the outside air introduction port and blows the air flow into the cabin, and the inside and outside air switching door is the introduction port door.

Accordingly, the inside and outside air switching door opens and closes the in-cabin introduction port of the air distribution destination duct instead of the introduction port door. Thus, the introduction port door can be eliminated.

According to an eighth aspect, the airflow control system includes: a heating determination section that determines whether it is necessary to heat the inside of the cabin; and a heating control section that, when the heating determination section determines that it is necessary to heat the inside of the cabin, controls the outlet door so that the air outlet is opened and controls the introduction port door so that the in-cabin introduction port of the air distribution destination duct is opened.

Accordingly, it is possible to perform heating inside the cabin using exhaust heat as needed.

According to a ninth aspect, the airflow control system includes: a defogging determination section that determines whether it is necessary to prevent fogging of the front windshield; and a defogging control section that, when the defogging determination section determines that it is necessary to prevent fogging of the front windshield, controls the outlet door so that the air outlet is opened.

Accordingly, it is possible to perform defogging of the front windshield using exhaust heat as needed.

According to a tenth aspect, the air distribution destination duct is disposed in a cowl area located between the inside of the cabin and the front windshield and the engine compartment in the vehicle.

The cowl area originally includes the hole communicating with the inside of the cabin through the fire wall. Thus, it is possible to introduce the air flow into the cabin using the hole.

According to an eleventh aspect, the airflow control system includes an introduction duct for guiding an air flow from the blowout port of the shroud to the air outlet of the engine compartment.

According to an twelfth aspect, the introduction duct is supported by an engine hood that covers the engine compartment in a top-bottom direction and is separable with respect to the shroud;

the introduction duct and the shroud are connected to each other when the engine hood covers the engine compartment; and the introduction duct and the shroud are separated from each other when the engine hood opens the engine compartment.

Accordingly, it is possible to easily perform inspection and maintenance of apparatuses under the introduction duct in a state in which the engine hood opens the engine compartment.

According to a thirteenth aspect, the airflow control system includes a sub air blower that is independent of the main air blower and serves as the air blower that blows an air flow containing the exhaust heat.

According to a fourteenth aspect, the airflow control system includes an introduction duct for guiding an air flow blown from the sub air blower to the air outlet of the engine compartment.

According to a fifteenth aspect, the air blower blows out an air flow through the return flow outlet of the introduction duct, and the blown out air flow is sucked into the air blower, so that a return air flow passing through the air blower and the introduction duct is generated.

According to a sixteenth aspect, the airflow control system includes an exhaust control section that, when the exhaust heat determination section determines that the heat inside the engine compartment should be discharged to the outside of the vehicle, controls the exhaust heat door so that the exhaust port is opened.

Accordingly, it is possible to automatically discharge heat inside the engine compartment to the outside of the vehicle as needed.

According to a seventeenth aspect, the exhaust port is disposed on a rear side in the vehicle traveling direction with respect to an undercover that covers the engine compartment from a lower side in the top-bottom direction and allows the inside of the engine compartment and the outside of the vehicle on the lower side in the top-bottom direction of the vehicle to communicate with each other.

Accordingly, as the air flow flows to the lower side of the undercover during traveling of the vehicle, the air pressure on the rear side in the vehicle traveling direction with respect to the undercover and outside the vehicle on the lower side in the top-bottom direction of the vehicle becomes lower than the air pressure inside the engine compartment. The exhaust heat inside the engine compartment can be discharged to the outside of the vehicle by such a change in the air pressure.

What is claimed is:

1. An airflow control system comprising:
   an air blower disposed on a front side in a vehicle traveling direction with respect to an inside of a cabin and disposed inside an engine compartment that houses a propulsion engine;
   an outlet door that opens and closes an air outlet through which an air flow from an inside of the engine compartment is blown to another area on a rear side in the vehicle traveling direction with respect to the engine compartment; and a single introduction duct formed to guide the air flow blown from the air blower to the air outlet, wherein, the air blower blows an air flow containing exhaust heat of the propulsion engine to the other area through the air outlet while the air outlet is opened by the outlet door;

the introduction duct forms a return flow outlet through which an air flow from the air blower is blown into the engine compartment, the introduction duct being further formed for guiding the air flow from the air blower to the return flow outlet; and the air blower blows out an air flow through the return flow outlet of the introduction duct, and the blown out air flow is sucked into the air blower, so that a return air flow passing through the air blower and the introduction duct is generated.

2. The airflow control system according to claim 1, further comprising:

an exhaust heat determination section that determines whether air inside the engine compartment contains exhaust heat of the propulsion engine to be used in the other area; and an airflow control section that, when the exhaust heat determination section determines that the air inside the engine compartment contains exhaust heat of the propulsion engine to be used in the other area, controls the outlet door so that the air outlet is opened and controls the air blower so that the air flow containing the exhaust heat is blown to the other area through the air outlet.

3. The airflow control system according to claim 2, further comprising:

a shutter that opens and closes a first air passage formed between the air blower and a front opening that opens the engine compartment toward the front side in the vehicle traveling direction; and a shroud that forms
  a second air passage provided between the air blower and the shutter, and
  a blowout port provided between the shutter and the air blower, an air flow blown from the second air passage being blown out through the blowout port, wherein when the airflow control section controls the air blower, while the first air passage between the front opening and the air blower is closed by the shutter, the air blower sucks the air flow containing the exhaust heat from the propulsion engine and blows out the sucked air flow through the blowout port of the shroud, and the blown out air flow is blown to the other area through the air outlet of the engine compartment.

4. The airflow control system according to claim 3, wherein the introduction duct guides an air flow from the blowout port of the shroud to the air outlet of the engine compartment.

5. The airflow control system according to claim 4, wherein the introduction duct is supported by an engine hood that covers the engine compartment in a top-bottom direction, the introduction duct being configured to be separable with respect to the shroud;

the introduction duct and the shroud are connected to each other when the engine hood covers the engine compartment; and the introduction duct and the shroud are separated from each other when the engine hood opens the engine compartment.

6. The airflow control system according to claim 3, further comprising:

a heat exchanger disposed between the front opening and the propulsion engine in the engine compartment and performs heat exchange between air in the engine compartment and the propulsion engine through a heating medium;

a main air blower disposed between the propulsion engine and the heat exchanger and blows out an air flow sucked from the front opening through the heat exchanger toward the propulsion engine; and a sub air blower which is independent of the main air blower and which serves as the air blower that blows an air flow containing the exhaust heat.

7. The airflow control system according to claim 6, wherein the introduction duct guides an air flow blown from the sub air blower to the air outlet of the engine compartment.

8. The airflow control system according to claim 2, further comprising an air distribution destination duct that guides an air flow from the air outlet of the engine compartment to an in-cabin introduction port for blowing an air flow into the cabin as the other area.

9. The airflow control system according to claim 8, wherein the air distribution destination duct is formed for guiding the air flow from the air outlet of the engine compartment to a shield blowout port through which an air flow is blown to an outer surface of a front windshield as the other area.

10. The airflow control system according to claim 9, further comprising an introduction port door that opens and closes the in-cabin introduction port of the air distribution destination duct.

11. The airflow control system according to claim 10, further comprising:

an air conditioning unit that includes an inside and outside air switching door that opens either an inside air introduction port through which an air flow is introduced from the inside of the cabin or an outside air introduction port through which an air flow is introduced from the in-cabin introduction port of the air distribution destination duct, and that adjusts a temperature of an air flow introduced through either the inside air introduction port or the outside air introduction port and blows the air flow into the cabin, wherein the inside and outside air switching door is the introduction port door.

12. The airflow control system according to claim 10, further comprising:

a heating determination section that determines whether it is necessary to heat the inside of the cabin; and a heating control section that, when the heating determination section determines that it is necessary to heat the inside of the cabin, controls the outlet door so that the air outlet is opened and controls the introduction port door so that the in-cabin introduction port of the air distribution destination duct is opened.

13. The airflow control system according to claim 12, further comprising:

a defogging determination section that determines whether it is necessary to prevent fogging of the front windshield; and a defogging control section that, when the defogging determination section determines that it is necessary to prevent fogging of the front windshield, controls the outlet door so that the air outlet is opened.

14. The airflow control system according to claim 8, wherein
the air distribution destination duct is disposed in a cowl area located between the inside of the cabin and the front windshield and the engine compartment in the vehicle.

15. The airflow control system according to claim 1, further comprising:
an exhaust heat door that opens and closes an exhaust port that allows the inside of the engine compartment and an outside of the vehicle to communicate with each other;
an exhaust heat determination section that determines whether heat inside the engine compartment should be discharged to the outside of the vehicle; and
an exhaust control section that, when the exhaust heat determination section determines that the heat inside the engine compartment should be discharged to the outside of the vehicle, controls the exhaust heat door so that the exhaust port is opened.

16. The airflow control system according to claim 15, wherein the exhaust port is disposed on a rear side in the vehicle traveling direction with respect to an undercover that covers the engine compartment from a lower side in the top-bottom direction, the exhaust port configured to allow the inside of the engine compartment and the outside of the vehicle on the lower side in the top-bottom direction of the vehicle to communicate with each other.

\* \* \* \* \*